(12) United States Patent
Martin et al.

(10) Patent No.: US 7,911,625 B2
(45) Date of Patent: Mar. 22, 2011

(54) PRINTING SYSTEM SOFTWARE ARCHITECTURE

(75) Inventors: Robert Martin, Sunnyvale, CA (US);
Deane A. Gardner, Cupertino, CA (US)

(73) Assignee: FUJIFILM Dimatrix, Inc., Lebanon, NH (US)

( * ) Notice: Subject to any disclaimer, the term of this patent is extended or adjusted under 35 U.S.C. 154(b) by 1132 days.

(21) Appl. No.: 10/966,024

(22) Filed: Oct. 15, 2004

(65) Prior Publication Data
US 2006/0082813 A1   Apr. 20, 2006

(51) Int. Cl.
- G06F 3/12 (2006.01)
- G06K 15/22 (2006.01)
- B41J 29/38 (2006.01)
- B41J 2/15 (2006.01)

(52) U.S. Cl. ............. 358/1.13; 358/1.4; 347/12; 347/40
(58) Field of Classification Search ............. 358/500
See application file for complete search history.

(56) References Cited

U.S. PATENT DOCUMENTS

| | | |
|---|---|---|
| 4,486,739 A | 12/1984 | Franaszek et al. |
| 4,563,689 A | 1/1986 | Murakami et al. |
| 5,138,333 A | 8/1992 | Bartky et al. |
| 5,359,350 A | 10/1994 | Nakano et al. |
| 5,361,084 A | 11/1994 | Paton et al. |
| 5,361,420 A | 11/1994 | Dobbs et al. |
| 5,369,420 A | 11/1994 | Bartky |
| 5,408,590 A | 4/1995 | Dvorzsak |
| 5,438,350 A | 8/1995 | Kerry |
| 5,463,414 A | 10/1995 | Temple et al. |
| 5,463,416 A | 10/1995 | Paton et al. |
| 5,512,796 A | 4/1996 | Paton |
| 5,512,922 A | 4/1996 | Paton |
| 5,521,619 A | 5/1996 | Suzuki et al. |
| 5,604,711 A | 2/1997 | Cheung |
| 5,604,771 A | 2/1997 | Quiros |
| 5,631,675 A | 5/1997 | Futagawa |
| 5,663,217 A | 9/1997 | Kruse |
| 5,668,579 A | 9/1997 | Fujii et al. |
| 5,731,048 A | 3/1998 | Ashe et al. |
| 5,779,837 A | 7/1998 | Harvey |

(Continued)

FOREIGN PATENT DOCUMENTS

CN   1410780 A   4/2003

(Continued)

OTHER PUBLICATIONS

U.S. Appl. No. 10/966,022, filed Oct. 15, 2004, Gardner.

(Continued)

*Primary Examiner* — Mark K Zimmerman
*Assistant Examiner* — Mesfin Getaneh
(74) *Attorney, Agent, or Firm* — Fish & Richardson P.C.

(57) ABSTRACT

Techniques, systems, and computer program products that facilitate image printing. A technique may include receiving an image to be printed, using a first software component to selectively pre-process the image depending on a format of the image, and using a second software component to generate image queues from the pre-processed image. In that technique, each image queue includes at least one portion of image data associated with an association of print elements that corresponds to a configuration of print elements at a printing device. The technique may be implemented in a scalable system, by having multiple first software components and multiple second software components, where each of the first and/or second components can reside on a separate computer system.

30 Claims, 9 Drawing Sheets

U.S. PATENT DOCUMENTS

| | | |
|---|---|---|
| 5,784,171 A | 7/1998 | Kano |
| 5,790,139 A | 8/1998 | Umeno et al. |
| 5,825,375 A | 10/1998 | Droit et al. |
| 5,837,046 A | 11/1998 | Schofield et al. |
| 5,842,258 A | 12/1998 | Harvey et al. |
| 5,843,219 A | 12/1998 | Griffin et al. |
| 5,854,886 A | 12/1998 | MacMillan et al. |
| 5,855,713 A | 1/1999 | Harvey |
| 5,903,754 A | 5/1999 | Pearson |
| 5,910,372 A | 6/1999 | Griffin et al. |
| 5,941,951 A | 8/1999 | Day et al. |
| 5,959,643 A | 9/1999 | Temple et al. |
| 5,975,672 A | 11/1999 | Wen |
| 5,984,448 A | 11/1999 | Yanagawa |
| 5,984,464 A | 11/1999 | Steinfield et al. |
| 5,997,124 A | 12/1999 | Capps et al. |
| 6,010,202 A | 1/2000 | Arnott |
| 6,014,153 A | 1/2000 | Harvey |
| 6,033,055 A | 3/2000 | Nagoshi et al. |
| RE36,667 E | 4/2000 | Michaelis et al. |
| 6,046,822 A | 4/2000 | Wen et al. |
| 6,088,050 A * | 7/2000 | Ng .................................. 347/237 |
| 6,089,698 A | 7/2000 | Temple et al. |
| 6,092,886 A | 7/2000 | Hosono |
| 6,102,513 A | 8/2000 | Wen |
| 6,106,092 A | 8/2000 | Norigoe et al. |
| 6,123,405 A | 9/2000 | Temple et al. |
| 6,193,343 B1 | 2/2001 | Norigoe et al. |
| 6,217,141 B1 | 4/2001 | Nakamura et al. |
| 6,228,311 B1 | 5/2001 | Temple et al. |
| 6,232,135 B1 | 5/2001 | Ashe et al. |
| 6,257,689 B1 | 7/2001 | Yonekubo |
| 6,260,951 B1 | 7/2001 | Harvey et al. |
| 6,270,179 B1 | 8/2001 | Nou |
| 6,276,772 B1 | 8/2001 | Sakata et al. |
| 6,281,913 B1 | 8/2001 | Webb |
| 6,286,943 B1 | 9/2001 | Ashe et al. |
| 6,295,077 B1 | 9/2001 | Suzuki |
| 6,312,076 B1 | 11/2001 | Taki et al. |
| 6,328,395 B1 | 12/2001 | Kitahara et al. |
| 6,331,040 B1 | 12/2001 | Yonekubo et al. |
| 6,331,045 B1 | 12/2001 | Harvey et al. |
| 6,339,480 B1 | 1/2002 | Yamada et al. |
| 6,352,328 B1 | 3/2002 | Wen et al. |
| 6,379,440 B1 | 4/2002 | Tatum et al. |
| 6,384,930 B1 | 5/2002 | Ando |
| 6,399,402 B2 | 6/2002 | Ashe et al. |
| 6,402,278 B1 | 6/2002 | Temple |
| 6,402,282 B1 | 6/2002 | Webb |
| 6,412,924 B1 | 7/2002 | Ashe et al. |
| 6,422,690 B1 | 7/2002 | Harvey et al. |
| 6,437,879 B1 | 8/2002 | Temple |
| 6,460,991 B1 | 10/2002 | Temple et al. |
| 6,467,863 B1 | 10/2002 | Imanaka et al. |
| 6,468,779 B1 | 10/2002 | Red'kina |
| 6,471,315 B1 | 10/2002 | Kurata |
| 6,476,096 B1 | 11/2002 | Molloy et al. |
| 6,505,918 B1 | 1/2003 | Condie et al. |
| 6,517,195 B1 | 2/2003 | Koeda |
| 6,565,191 B1 * | 5/2003 | Bolash et al. .................... 347/40 |
| 6,568,779 B1 | 5/2003 | Pulman et al. |
| 6,572,221 B1 | 6/2003 | Harvey et al. |
| 6,652,068 B2 | 11/2003 | Hsu et al. |
| 6,666,537 B1 | 12/2003 | Kelley et al. |
| 6,685,297 B2 | 2/2004 | Butterfield et al. |
| 6,752,482 B2 | 6/2004 | Fukano et al. |
| 6,764,154 B2 | 7/2004 | Nishikori et al. |
| 6,882,711 B1 | 4/2005 | Nicol |
| 7,076,724 B2 | 7/2006 | Cole et al. |
| 7,234,788 B2 | 6/2007 | Gardner |
| 7,234,799 B2 | 6/2007 | Kwan et al. |
| 7,436,540 B2 | 10/2008 | Okamoto et al. |
| 2002/0033644 A1 | 3/2002 | Takamura |
| 2002/0186393 A1 | 12/2002 | Pochuer et al. |
| 2003/0081227 A1 | 5/2003 | Williams |
| 2003/0160836 A1 | 8/2003 | Fukano et al. |
| 2004/0000560 A1 | 1/2004 | Henry et al. |
| 2004/0028830 A1 | 2/2004 | Bauer |
| 2004/0070791 A1 * | 4/2004 | Pattusamy et al. ........... 358/1.16 |
| 2004/0113959 A1 | 6/2004 | Tamura |
| 2005/0018940 A1 | 1/2005 | Obayashi |
| 2005/0041073 A1 | 2/2005 | Fontaine et al. |
| 2005/0195229 A1 | 9/2005 | Barss |
| 2005/0270329 A1 * | 12/2005 | Hoisington et al. ............ 347/42 |
| 2006/0005099 A1 | 2/2006 | Murakami et al. |
| 2006/0066701 A1 * | 3/2006 | Hirakawa ...................... 347/101 |
| 2006/0087523 A1 * | 4/2006 | Horsnell et al. .................. 347/5 |
| 2007/0206038 A1 | 9/2007 | Baker |
| 2007/0236535 A1 | 10/2007 | Baker et al. |
| 2008/0158279 A1 | 7/2008 | Barss |

FOREIGN PATENT DOCUMENTS

| | | |
|---|---|---|
| CN | 101040505 | 9/2007 |
| CN | 101052942 | 10/2007 |
| CN | 101052943 | 10/2007 |
| CN | 101052974 | 10/2007 |
| CN | 101091153 A | 12/2007 |
| CN | 101189622 | 5/2008 |
| EP | 0 375 147 | 6/1990 |
| EP | 0 600 707 | 6/1994 |
| EP | 0 827 838 | 3/1998 |
| EP | 0 876 915 | 11/1998 |
| EP | 0 810 097 | 3/1999 |
| EP | 0 919 382 | 6/1999 |
| EP | 0964339 A2 | 12/1999 |
| EP | 1 212 201 | 6/2002 |
| EP | 1267254 A2 | 12/2002 |
| EP | 1293341 A2 | 3/2003 |
| EP | 1452313 A1 | 9/2004 |
| EP | 1 805 593 | 7/2007 |
| EP | 1 810 127 | 7/2007 |
| EP | 1 810 223 | 7/2007 |
| EP | 1 810 482 | 7/2007 |
| EP | 1 820 087 | 8/2007 |
| EP | 1 820 088 | 8/2007 |
| JP | 58055253 | 4/1983 |
| JP | 03065069 | 3/1991 |
| JP | 10-31566 | 2/1998 |
| JP | 11-123861 | 5/1999 |
| JP | 11338651 | 12/1999 |
| JP | 2000-255019 | 9/2000 |
| JP | 2000246862 | 9/2000 |
| JP | 2000326560 | 11/2000 |
| JP | 2001/010035 | 1/2001 |
| JP | 2003244391 | 8/2003 |
| JP | 2008-516801 | 5/2008 |
| JP | 2008-516802 | 5/2008 |
| JP | 2008-516803 | 5/2008 |
| JP | 2008-517379 | 5/2008 |
| JP | 2008-517380 | 5/2008 |
| JP | 2008-517811 | 5/2008 |
| KR | 2007-0062532 | 6/2007 |
| KR | 2007-0062549 | 6/2007 |
| KR | 2007-0065348 | 6/2007 |
| KR | 2007-0065383 | 6/2007 |
| KR | 2007-0065384 | 6/2007 |
| KR | 2007-0095277 | 9/2007 |
| WO | 01/12444 | 2/2001 |
| WO | 01/13328 | 2/2001 |
| WO | 03/094502 | 11/2003 |
| WO | 2004/000560 | 12/2003 |
| WO | 2006/044530 | 4/2006 |
| WO | 2006/044587 | 4/2006 |
| WO | 2006/044597 | 4/2006 |
| WO | 2006/044598 | 4/2006 |
| WO | 2006/044599 | 4/2006 |
| WO | 2006/049836 | 5/2006 |

OTHER PUBLICATIONS

U.S. Appl. No. 10/966,205, filed Oct. 15, 2004, Gardner.
U.S. Appl. No. 10/966,023, filed Oct. 15, 2004, Gardner et al.
U.S. Appl. No. 10/966,019, filed Oct. 15, 2004, Gardner et al.
U.S. Appl. No. 10/977,298, filed Oct. 29, 2004, Martin.
Communication pursuant to Article 94(3), Mar. 24, 2009, European Patent Office.
Authorized Officer Eric Walsh, International Search Report and Written Opinion for Application No. PCT/US2005/036936, dated Jul. 12, 2007, 16 pgs.
Authorized Officer Nora Lindner, International Preliminary Report on Patentability for Application No. PCT/US2005/036936, dated Jan. 10, 2008, 5 pgs.
Authorized Officer Marja Brouwers, International Search Report and Written Opinion for Application No. PCT/US2005/036935, dated May 31, 2006, 5 pgs.
Authorized Officer Nora Lindner, International Preliminary Report on Patentability for Application No. PCT/US2005/036935, dated Apr. 26, 2007, 7 pgs.
Authorized Officer Ludmilla Mako, International Search Report and Written Opinion for Application No. PCT/US2005/036920, dated Feb. 20, 2006, 10 pgs.
Authorized Officer Simin Baharlou, International Preliminary Report on Patentability for Application No. PCT/US2005/036920, dated Apr. 26, 2007, 7 pgs.
Authorized Officer Maria Rodriguez Novoa, International Search Report and Written Opinion issued in PCT/US2005/036934, dated Dec. 6, 2006, 15 pgs.
Authorized Officer Nora Lindner, International Preliminary Report on Patentability for Application No. PCT/US2005/036934, dated Apr. 26, 2007, 7 pgs.
Authorized Officer Marja Brouwers, International Search Report and Written Opinion for Application No. PCT/US2005/036807, dated Nov. 30, 2006, 10 pgs.
Authorized Officer Beate Giffo-Schmitt, International Preliminary Report on Patentability for Application No. PCT/US2005/036807, dated May 10, 2007, 7 pgs.
Authorized Officer Eric Walsh, International Search Report and Written Opinion for Application No. PCT/US2005/036808, dated Feb. 21, 2006, 11 pgs.
Authorized Officer Beate Giffo-Schmitt, International Preliminary Report on Patentability for Application No. PCT/US2005/036808, dated Apr. 26, 2007, 8 pgs.
8B/10B-encoding scheme. (8 pgs.) [Online], [retrieved on Sep. 3, 2008]. Retrieved from the Internet: <URL:http://en.wikipedia.org/wiki/8B/10B_encoding>.
David A. Johns et al., "Analog Integrated Circuit Design," Jon Wiley & Sons, Inc., 1997. pp. 39-42, 396-397 and 398-400.
IEEE 802.3 Standard. (4 pgs.)[Online], [retrieved on Sep. 6, 2008]. Retrieved from the Internet: <URL:http://en.wikipedia.org/wiki/IEEE802.3>.
Sachs, "Fibre Channel and Related Standards", IEEE Communications Magazine, IEEE Service Center, vol. 34, Aug. 1996, pp. 40-50.
Fibre Channel Protocol. (7 pgs.).[Online], [retrieved on Sep. 7, 2008]. Retrieved from the Internet: URL:http://en.wikipedia.org/wiki/Fibre_Channel_Protocol.
Fibre Channel-Physical and Signaling Interface (FC-PH), American National Standards Institute, ANSI X3.230-1994, 461 pgs.
Japanese Office Action dated Aug. 10, 2010, issued in JP 2007-536879, 3 pages.
Japanese Office Action dated Aug. 17, 2010, issued in JP 2007-536913, 2 pages.

* cited by examiner

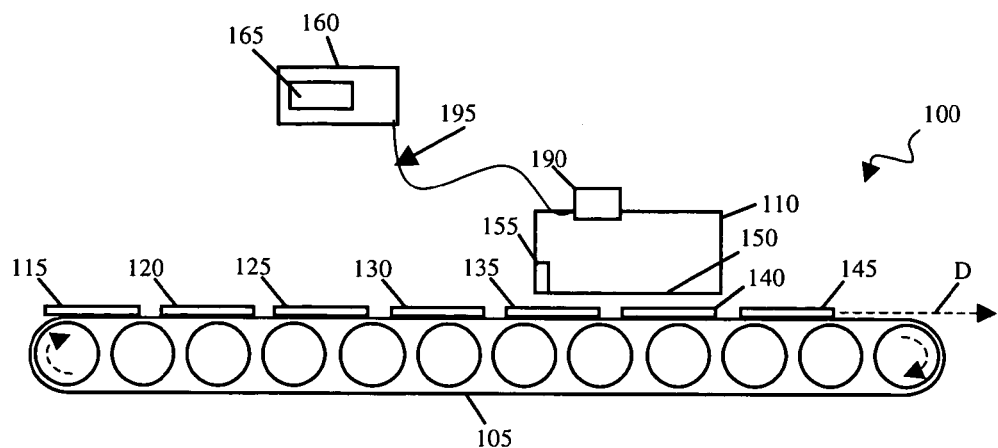
FIG. 1
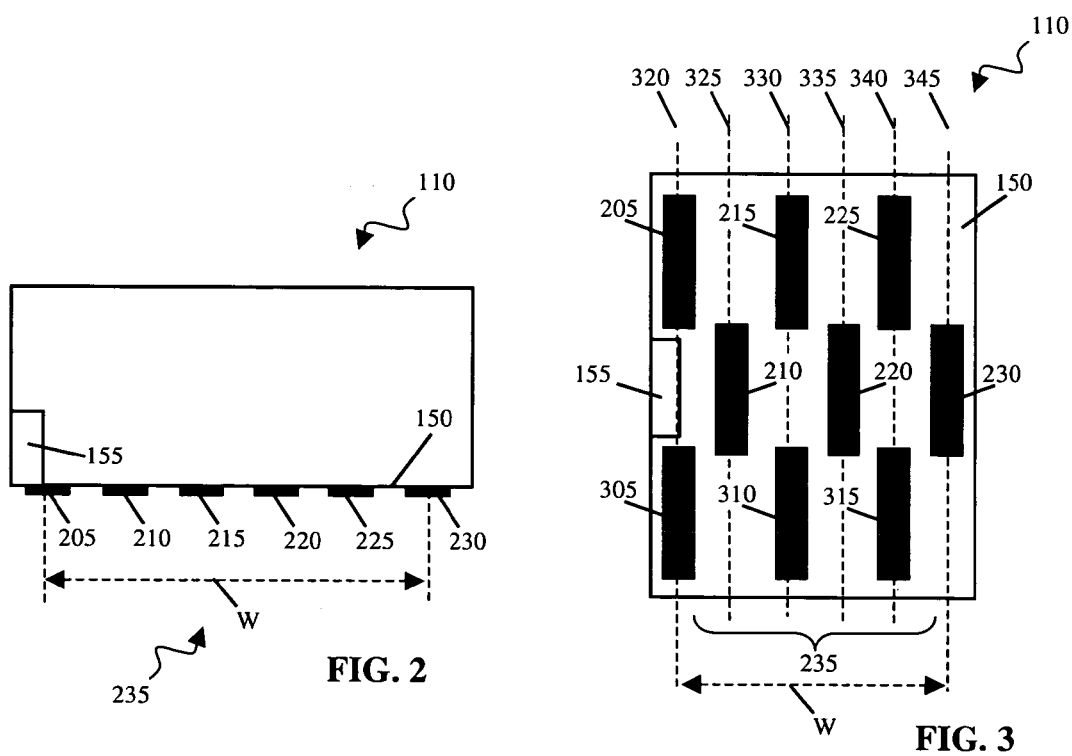
FIG. 2
FIG. 3

PRINTING SYSTEM SOFTWARE ARCHITECTURE

BACKGROUND

This disclosure relates to systems, computer program products, and techniques for printing an image.

When an image such as a picture or a page of text is printed, image data is generally translated, by software, into a format understandable by a printing device (i.e., a printer) and relayed to a print buffer associated with the printing device. The print buffer receives the translated image data and stores at least a portion of the image data for subsequent printing by the printing device.

Many printing devices include multiple discrete print elements (e.g., nozzles for inkjet printers). The print elements can be deployed to print selected components of the image. For example, selected print elements can be deployed to print at selected locations on a workpiece. As another example, in color printing, selected print elements can be deployed to print selected colors. Image data from the print buffer can be used by control electronics to coordinate the printing of images by deployed print elements.

The print elements in a printing device can be arranged in groups called print modules (e.g., a physical group of inkjet nozzles). The print elements in a module can be grouped according to the deployment of the constituent elements. For example, print elements that print at a selected array of positions can be grouped in a print module. As another example, print elements that print a selected color (at a selected array of positions) can be grouped in a print module.

SUMMARY

Described herein are methods and apparatus, including computer program products, that facilitate image printing.

In one general aspect, the techniques feature a computer-implemented method of facilitating image printing. That method includes transferring an image to be printed to a first software component, using the first software component to selectively pre-process the image depending on a format of the image, and using a second software component to generate image queues from the pre-processed image. In that method, each image queue includes at least one portion of image data associated with an association of print elements that correspond to a configuration of print elements at a printing device.

Implementations may include one or more of the following features. A portion of image data may be an image data buffer storing a sufficient amount of image data to cause a print element association to leave a single impression on a workpiece. A portion of image data may be an image data buffer storing image data sufficient to cause a print element association to leave impressions on one or more workpieces. The print elements may include inkjet nozzles. Transferring the image may include receiving the image from a storage device.

The first and second software components may be accessible via an application programming interface. The first and second software components may be software services. The method may further include sending an indication of an image to print and an indication of the second software component from an application that includes a user interface to the first software component. The user interface may be a third component that is a separate application from the first and second software components and resides on a machine separate from the machine where the first and second software components reside. Using a second software component to generate image queues may include generating image queues such that each image queue is located in a predefined memory location for access by a data pump. The memory location may be partitioned memory that is inaccessible by memory management of an operating system. Using a second software component to generate image queues ay include generating image queues according to generic routines and a table generated based on printing parameters. In that case, the method may further include generating the table based on printing parameters.

The first software component may include an image control component. The second software component may include an image queue generating component. Using a second software component to generate image queues may include parallel processing image data to generate image queues from the transferred image. The method may further include transferring an Xth image to be printed to an Nth software component, using the Nth software component to selectively pre-process the Xth image depending on a format of the image, and using an Mth software component to generate Xth image queues corresponding to the Xth transferred image where each image queue includes at least one portion of image data associated with an association of print elements that correspond to the configuration of print elements at the printing device.

In another aspect, a system for controlling image printing includes a data repository configured to store images, a memory area configured to store one or more image queues corresponding to an image being printed, and a computer system operable to perform tasks. The computer system is operable to perform tasks that include transferring from the data repository an image to be printed to a first software component, using the first software component to determine a format of an image and to selectively pre-process the image depending on the determined format, and using a second software component to generate in the memory area image queues corresponding to the image. Each image queue includes at least one portion of image data associated with an association of print elements that correspond to a configuration of print elements at a printing device.

Implementations may include one or more of the following features. The print elements may include inkjet nozzles. The first and second software components may be accessible via an application programming interface. The first and second software components may be software services and the computer system may be further operable to send an indication of an image to print and an indication of the second software component from an application that includes a user interface to the first software component. The user interface may be a third component that is a separate application from the first and second software components and resides on a machine separate from the machine where the first and second software components reside. The memory area may be partitioned memory that is inaccessible by memory management of an operating system.

The first software component may include an image control component. The second software component may include an image queue generating component. Using a second software component to generate image queues may include parallel processing image data to generate the image queues from the transferred image. The computer system may be further operable to transfer an Xth image to be printed to an Nth software component, use the Nth software component to selectively pre-process the Xth image depending on a format of the image, and use an Mth software component to generate Xth image queues corresponding to the Xth transferred image, where each image queue includes at least one portion of image data associated with an association of print elements that correspond to the configuration of print elements at the printing device.

In another aspect, a software-implemented system includes one or more first software components configured to receive an image to be printed, determine a format of the received image, and selectively pre-process the received image depending on the determined format; and one or more second software components configured to generate image queues corresponding to a pre-processed image such that each image queue includes at least one portion of image data associated with an association of print elements that correspond to a configuration of print elements at a printing device.

Implementations may include one or more of the following features. The first software components configured to receive an image may further include the first software components being configured to receive an indication of another software component to transfer a pre-processed image; and the first software component may be further configured to transfer the pre-processed image to the second software components. The software implemented system may further include a user interface component configured to interact with a user and send an indication of an image to be printed to the first software components. The first and second software components may be services and the user interface component is an application. Each of the first software components may reside on a separate computer system, and each of the second software components may reside on a separate computer system.

The described systems, computer program products, and techniques of facilitating printing of an image can be implemented to realize one or more of the following advantages.

Images may be divided into image queues that correspond to print element associations (i.e., a configuration of associated printing elements that collectively form a print head). By splitting an image into multiple image queues, such that there is one image queue for each print element association, each print element association can print a portion of an image. Because images are divided into portions for each print element association, multiple images can be printed at the same time by placing portions of image data from different images in different image queues. For example, two images can be printed close to each other on two different surfaces at a printing device that has eight print element associations if the first four print element associations receive image data from four image queues containing image data from a first image, and if a second set of four print element associations receive image data from another set of four image queues that contain image data from a second image.

The control architecture that processes images and generates the image queues may be two-tiered, including a high-level driver (referred to as an image control component) and a low-level driver (referred to as an image queue generating component). In that architecture, a high level driver may perform all pre-processing of data (e.g., converting file formats) and a low-level driver may generate image queues. By having a two-tiered approach that splits these tasks, the architecture may be scaled to include any number of high-level or low-level drivers.

The details of one or more implementations are set forth in the accompanying drawings and the description below. Other features, objects, and advantages of the invention will be apparent from the description and drawings, and from the claims.

DESCRIPTION OF DRAWINGS

FIG. 1 is a block diagram of a print system.

FIGS. 2 and 3 illustrate an arrangement of print modules and print elements in the print system of FIG. 1.

Like reference symbols in the various drawings indicate like elements.

DETAILED DESCRIPTION

Figure 4:
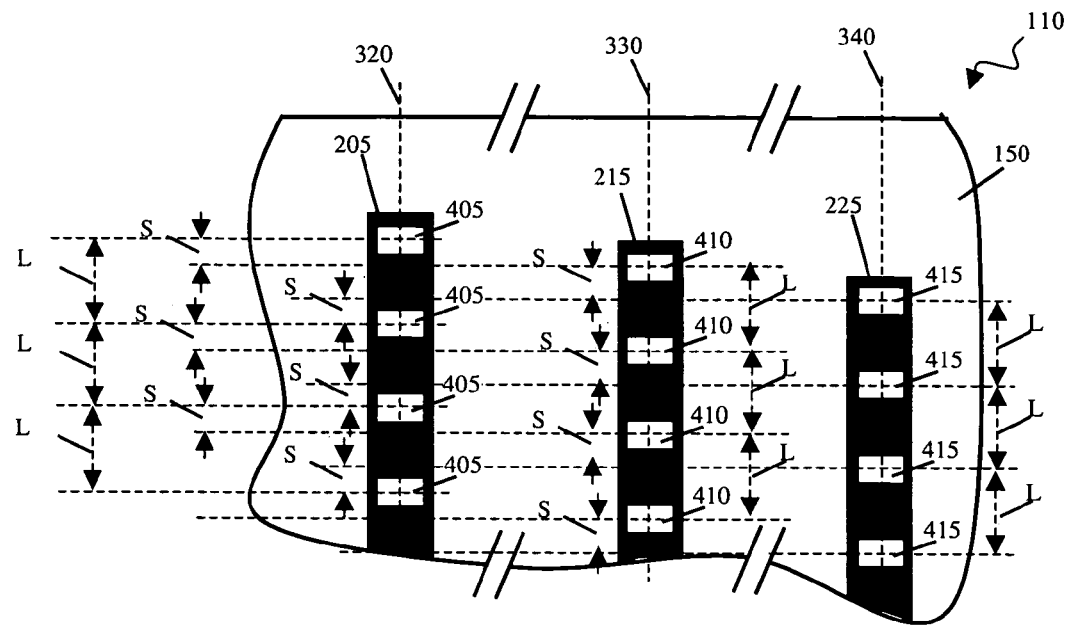
FIG. 4 schematically illustrates the deployment of print elements with relative shifts in lateral position.

FIG. 1 is a block diagram of a print system 100. Print system 100 includes a workpiece conveyor 105 and a printer housing 110. Workpiece conveyor 105 produces relative motion between a series of workpieces 115, 120, 125, 130, 135, 140, 145 and printer housing 110. In particular, workpiece conveyor 105 conveys workpieces 115, 120, 125, 130, 135, 140, 145 in a direction D across a face 150 of printer housing 110. Workpiece conveyor 105 can include a stepper or continuous motor that moves a roller, a belt, or other element that can retain workpieces 115, 120, 125, 130, 135, 140, 145 during conveyance. Workpieces 115, 120, 125, 130, 135, 140, 145 can be any of a number of different substrates upon which system 100 is to print. For example, workpieces 115, 120, 125, 130, 135, 140, 145 can be paper, cardboard, microelectronic devices, or foodstuffs.

Printer housing 110 houses a workpiece detector 155. Workpiece detector 155 can detect the position of one or more workpieces 115, 120, 125, 130, 135, 140, 145. For example, workpiece detector 155 can be a laser/photodetector assembly that detects the passage of edges of workpieces 115, 120, 125, 130, 135, 140, 145 across a certain point on face 150.

Located remotely from the printer housing 110 are control electronics 160. The control electronics 160 interface with the printer housing 110 by a cable 195 (e.g., an optical cable) and minimal electronics 190. Control electronics 160 control the performance of print operations by system 100. Control electronics 160 can include one or more data processing devices that perform operations in accordance with the logic of a set of machine-readable instructions. Control electronics 160 may be, for example, a personal computing system that runs image processing software and software for controlling printing at the printer housing 110.

Located within the control electronics 160 is a print image buffer 165. Print image buffer 165 is one or more data storage devices that store image data for printing by print elements. For example, print image buffer 165 can be a collection of random access memory (RAM) devices. Print image buffer 165 can be accessed by control electronics 160 to store and retrieve image data.

The control electronics 160 interface with the printer housing 110 via the cable 195 and minimal electronics 190. The control electronics 160 can send data across the cable 195, and the minimal electronics 190 can receive that data for printing at the printer housing 110. The control electronics 160 may have special circuitry (e.g., a data pump, as described in more detail in reference to FIG. 10, that can receive and/or retrieve image data from print image buffers, store the image data, and enable print elements at a printing device to receive image data in time to deposit ink on the corresponding image locations on workpieces as they are moving along a conveyor) for generating data to send to the printer housing 110. The minimal electronics 190 may be, for example, a field-programmable gate array that includes a microprocessor, transceiver, and minimal memory. The minimal electronics 190 may be connected to the printer housing 110 such that the minimal electronics 190 can be disconnected easily should the printer housing 110 and/or hardware in the printer housing 110 be changed. For example, if the printer housing 110 is replaced with a newer printer housing containing newer printing modules, the minimal electronics 190 can be disconnected from the older printer housing 110 and connected to the newer printer housing.

The printing of an image is divided between the control electronics 160 and the minimal electronics 190 such that the control electronics performs image processing and controls printing, whereas the minimal electronics 190 receives data received via the cable 195 and uses that data to cause firing of print elements at the printer housing 110. Thus, for example, image data may be converted to jetmap image data, which may include dividing the image data into multiple image queues of image buffers as part of the process of converting to jetmap image data (as described in more detail later); delays may be inserted into image data (e.g., inserting delays corresponding to a deployment of print element associations); and image data may be sent (e.g., encoding data packets of image data and sending by a receiver) at an appropriate time by the control electronics 160; whereas, the minimal electronics 190 may merely receive the image data (e.g., decode image data packets sent across the cable 195) and relay the image data such that the image data is printed on a workpiece (e.g., cause firing of inkjet nozzles according to the image data). The control electronics 160 may synchronize printing of an image at the printer housing 110. Following the previous example, the control electronics 160 may synchronize the printing of an image by receiving an indication of a leading edge of a workpiece and sending image data across the cable 195 to cause the printing of an image at the printer housing 110.

The control electronics 160 can send image data to the printer housing 110 at high data rates to enable "just-in-time" printing of images on the workpieces as the workpieces move along the workpiece conveyor 105. In one implementation of just-in-time printing, transmission of image data to the printer housing 110 can serve as a trigger that causes the image data in a packet to be printed "substantially immediately" as the data arrives at the printer housing 110. In this implementation, the image data may not be stored on a storage component on the printer housing prior to printing the image data, but can be printed as the data arrives at the printer housing. Just-in-time printing may also refer to printing image data substantially at an instant at which the image data arrives at the printer housing.

In another implementation of just-in-time printing, data received at the printer housing is stored in one or more latches, and new or subsequent data that is being received at the printer housing can serve as a trigger to print the latched data. In this implementation, the data received at the printer housing is stored in a latch until the subsequent data arrives at the printer housing, and the subsequent data arriving at the printer housing can serve as a trigger to print the data that has been latched. The data, subsequent data, and latched data may be received and/or stored at the printer housing in the form of an image data packet. In one case, the subsequent data arriving at the printer housing is the next subsequent data. Alternatively, the subsequent data arriving at the printer housing is subsequent data other than the next subsequent data, such as subsequent data arriving after the next subsequent data. Because the image data is being printed at such a high-data rate, the data printed from latched data can also refer to data being printed "substantially immediately" as the data is arriving at the printer housing.

Because the printer housing 110 has minimal electronics 190 and a reduced amount of memory, the printer housing 110 may be implemented, at a lower cost. The type of memory used on the printer housing 110 may also be implemented at a lower cost. In one implementation, the type of memory implemented on the printer housing 110 is part of a field-programmable gate array (FPGA) integrated circuit (IC) that may be part of the minimal electronics 190. The costs and engineering design efforts to implement the printer housing 110 may also be reduced due to little or no buffering of high speed image data at the printer housing 110. The system 100 may offer scalable transmission of high bandwidth, synchronous, just-in-time image data to the printer housing 110 in a number of configurations, including, for example, a configuration with multiple FGPAs at the printer housing 110, each of which may implement the minimal electronics 190 and interface with one or more data pumps using one or more cables.

FIGS. 2 and 3 illustrate the arrangement of print modules and print elements on housing 110. In particular, FIG. 2 shows housing 110 from the side, whereas FIG. 3 shows housing 110 from below.

Housing 110 includes a collection of print modules 205, 210, 215, 220, 225, 230, 305, 310, 315 on face 150. Print modules 205, 210, 215, 220, 225, 230, 305, 310, 315 each include one or more print elements. For example, print modules 205, 210, 215, 220, 225, 230, 305, 310, 315 can each include a linear array of inkjet nozzles.

Print modules 205, 305 are arranged laterally along a column 320. Print module 210 is arranged along a column 325. Print modules 215, 310 are arranged laterally along a column 330. Print module 220 is arranged along a column 335. Print modules 225, 315 are arranged laterally along a column 340. Print module 230 is arranged along a column 345. This arrangement of print modules 205, 210, 215, 220, 225, 230, 305, 310, 315 along columns 325, 330, 335, 340, 345 spans an effective print area 235 on face 150. Effective print area 235 has a longitudinal width W that spans from the print elements in print modules 205, 305 to the print elements in print module 230.

Print modules 205, 210, 215, 220, 225, 230, 305, 310, 315 can be deployed in print element associations to print selected components of an image. For example, print modules 205, 210, 305 can be deployed in a first print element association to print a first color across the entire lateral expanse of a substrate moving across face 150, print modules 215, 220, 310 can be deployed in a second print element association to print a second color across the entire lateral expanse, and print modules 225, 230, 315 can be deployed in a third print element association to print a third color across the entire lateral expanse.

As another example, the group of print modules 205, 210, 215, 220, 225, 230, 305, 310, 315 can be deployed in print element associations based on the columnar position of the constituent print elements in the modules. For example, a first print element association can include modules 205, 305 deployed so that their constituent print elements are arranged in a single column. A second print element association can include only print module 210. Modules 215, 310 can form a third association. Associations four, five, and six include modules 220, 225 and 315, and 230, respectively. Forming associations of print elements in this columnar manner allows the printing of back-to-back dissimilar images with variable but small or nonexistent non-printed area between finished image areas, relative to longitudinal width W, without need for complex real-time adjustments in image data.

As another example, the group of print modules 205, 210, 215, 220, 225, 230, 305, 310, 315 can be deployed in print element associations based on the lateral position of the constituent print elements in the modules. For example, a first print element association can include modules 205, 210, 305 deployed so that their constituent print elements are shifted in lateral position relative to the print elements in modules 215, 220, 310 and to the print elements in modules 225, 230, 315. A second print element association can include print modules 215, 220, 310 deployed so that their constituent print elements are shifted in lateral position relative to the print elements in modules 205, 210, 305 and to the print elements in modules 225, 230, 315. Modules 225, 230, 315 can form a third association. The relative shifts in position can be smaller than the lateral spacing of the print elements in the modules to, in net effect, decrease the lateral spacing between print elements on housing 110 and thereby effectively increase the resolution at which an image can be printed.

As another example, groups of print modules can be deployed in print element associations based on the lateral expanses covered by the print modules. For example, a first print element association can include modules 205, 305, 215, 310, 225, 315 deployed to cover the laterally outer expanses of a workpiece. A second print element association can include print modules 210, 220, 230 deployed to cover the laterally central expanses of a workpiece.

As another example, groups of print elements can be deployed in print element associations based on a combination of these and other factors. For example, groups of print elements can be deployed in a print element association based on their printing the color cyan on an outer extent of a workpiece. As another example, groups of print modules can be deployed in a print element association based on their constituent print elements printing at certain lateral positions on the laterally outer expanses of a workpiece.

Each print element association can have a dedicated memory location in print image buffer 165 (shown in FIG. 1) in that the association prints image data that once resided in the memory location. For example, when print image buffer 165 is a collection of queues of individual buffers, each print element association can have an individual, dedicated queue of buffers.

FIG. 4 schematically illustrates a deployment of print elements with relative shifts in lateral position. The illustrated portion of housing 110 includes print modules 205, 215, 225. Print module 205 includes an array of print elements 405 laterally separated from one another by a distance L. Print module 215 includes an array of print elements 410 laterally separated from one another by a distance L. Print module 225 includes an array of print elements 415 laterally separated from one another by a distance L.

Print elements 405 are shifted relative to the lateral position of print elements 410 by a shift distance S. Print elements 405 are shifted relative to the lateral position of print elements 415 by shift distance S. Print elements 410 are shifted relative to the lateral position of print elements 415 by shift distance S. Shift distance S is smaller than distance L, and the net effect of the relative lateral shifts between print elements 405, print elements 410, and print elements 415 is to decrease the overall lateral spacing between print elements on face 150 of housing 110.

Figure 5:
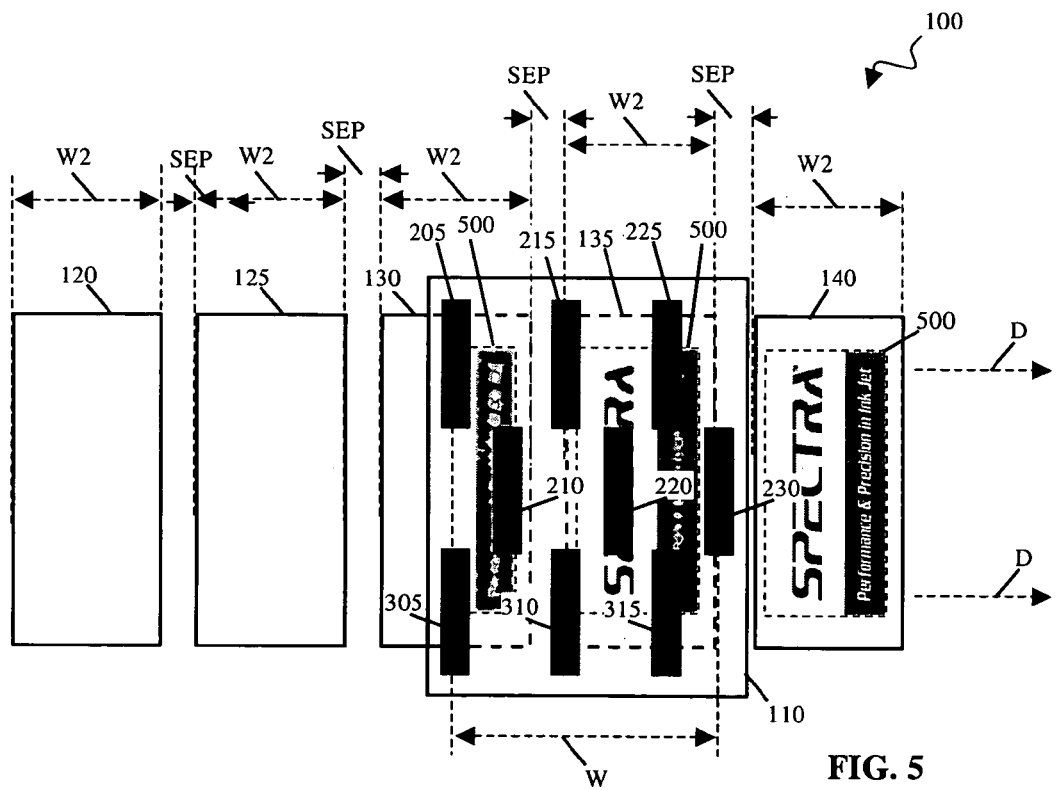
FIG. 5 schematically illustrates the serial printing of an image on different workpieces.

FIG. 5 schematically illustrates the serial printing of an image 500 on two or more different workpieces using print system 100. A series of workpieces 120, 125, 130, 135, 140 is conveyed across effective print area 235 on face 150 of printer housing 110 for printing. Image 500 can be serially printed in that image 500 can be printed sequentially on workpieces 120, 125, 130, 135, 140 (i.e., the same image is printed, in succession, on various workpieces).

Workpieces 120, 125, 130, 135, 140 each have a longitudinal width W2. Workpiece width W2 is smaller than width W of effective print area 235. A leading edge of workpiece 120 is separated from a trailing edge of workpiece 125 by separation distance SEP. A leading edge of workpiece 125 is separated from a trailing edge of workpiece 130 by separation distance SEP. A leading edge of workpiece 130 is separated from a trailing edge of workpiece 135 by separation distance SEP. A leading edge of workpiece 135 is separated from a trailing edge of workpiece 140 by separation distance SEP. The separation distance SEP may be smaller than width W of effective print area 235. The separation distance SEP may be zero. As such, both workpiece 130 and workpiece 135 may be positioned in effective print area 235 simultaneously and be printed on at the same time.

System 100 has partially printed image 500 on both workpiece 130 and workpiece 135. Such serial printing of image 500 on two or more different workpieces using a single effective print area speeds the throughput of workpieces in system 100.

Figure 6:
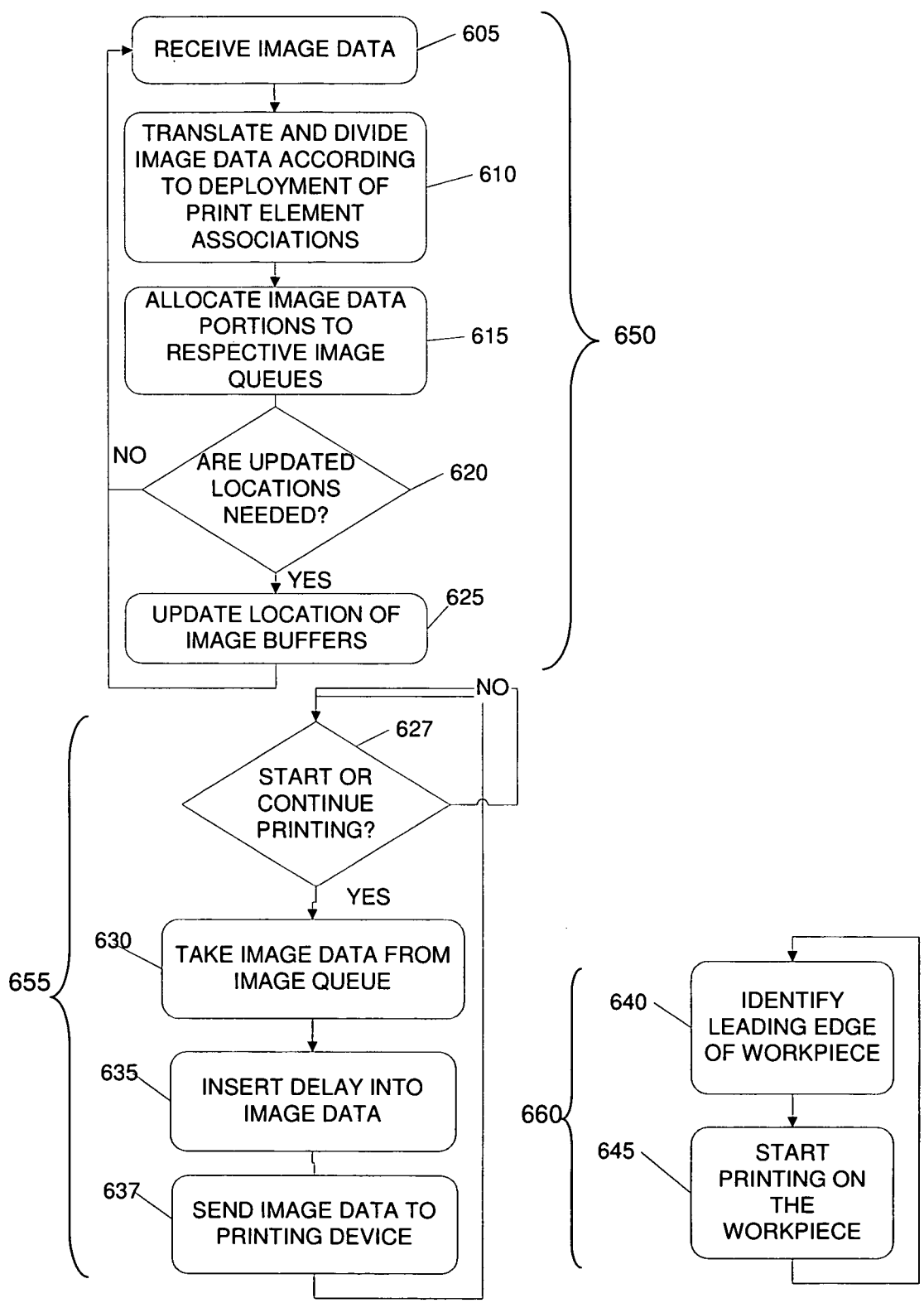
FIG. 6 includes flowcharts of processes for the serial printing of an image on different workpieces.

FIG. 6 includes flowcharts of processes 650, 655, 660 for the serial printing of an image on two or more different workpieces using a single effective print area. Processes 650, 655, 660 can be performed in whole or in part by a data processing apparatus and/or circuitry configured to exchange data with a buffer and control printing by print elements. In system 100, processes 650, 655, 660 can be performed by control electronics 160 using input received from workpiece conveyor 105 and workpiece detector 155. Within the control electronics 160, different processes may be performed by different parts of the system 100. For example, the process 650 may be performed by software operating in the control electronics 160 and the processes 655 and 660 may be performed by a data pump. The processes of 650, 655, and 660 are separate to indicate that they can be performed concurrently and/or independently of each other.

The system performing the process 650 receives image data at 605. The image data can be a stand-alone collection of data regarding an individual image. For example, the image data can be a graphic image format (gif) file, a joint photographic experts group (jpeg) file, PostScript, Printer Command Language (PCL), or other image data collection.

The system can then translate and divide the received image data according to a deployment of associated print elements at 610. The image data can be translated before it is divided, divided before it is translated, or translated and divided as part of the same process. The translation of image data can include, for example, a conversion of image data into a format understandable by a printing device, such as bitmap raster data, and a further conversion of the bitmap raster data into jetmap data. Converting bitmap raster image data into jetmap data involves taking an input bitmap, which is arranged in an order corresponding to a geographic order used by the bitmap image format, and rearranging the bitmap raster image data to correspond to physical locations of the print elements. It may also involve dividing the image data as part of the process of converting the bitmap raster image data to jetmap data (i.e., the jetmap data is divided into image buffers corresponding print element associations). As an example, the process at 610 may include converting jpeg formatted image data to bitmap formatted image data, and then converting the bitmap formatted image data into jetmap image data as image buffers corresponding to print element associations. In an alternative implementation, image data may be converted directly to jetmap data without first converting to an intermediary format.

The division of image data according to the deployment of associated print elements can include the identification of portions of the image data that are to be printed by an association of print elements based on the deployment of the association.

Figure 7:
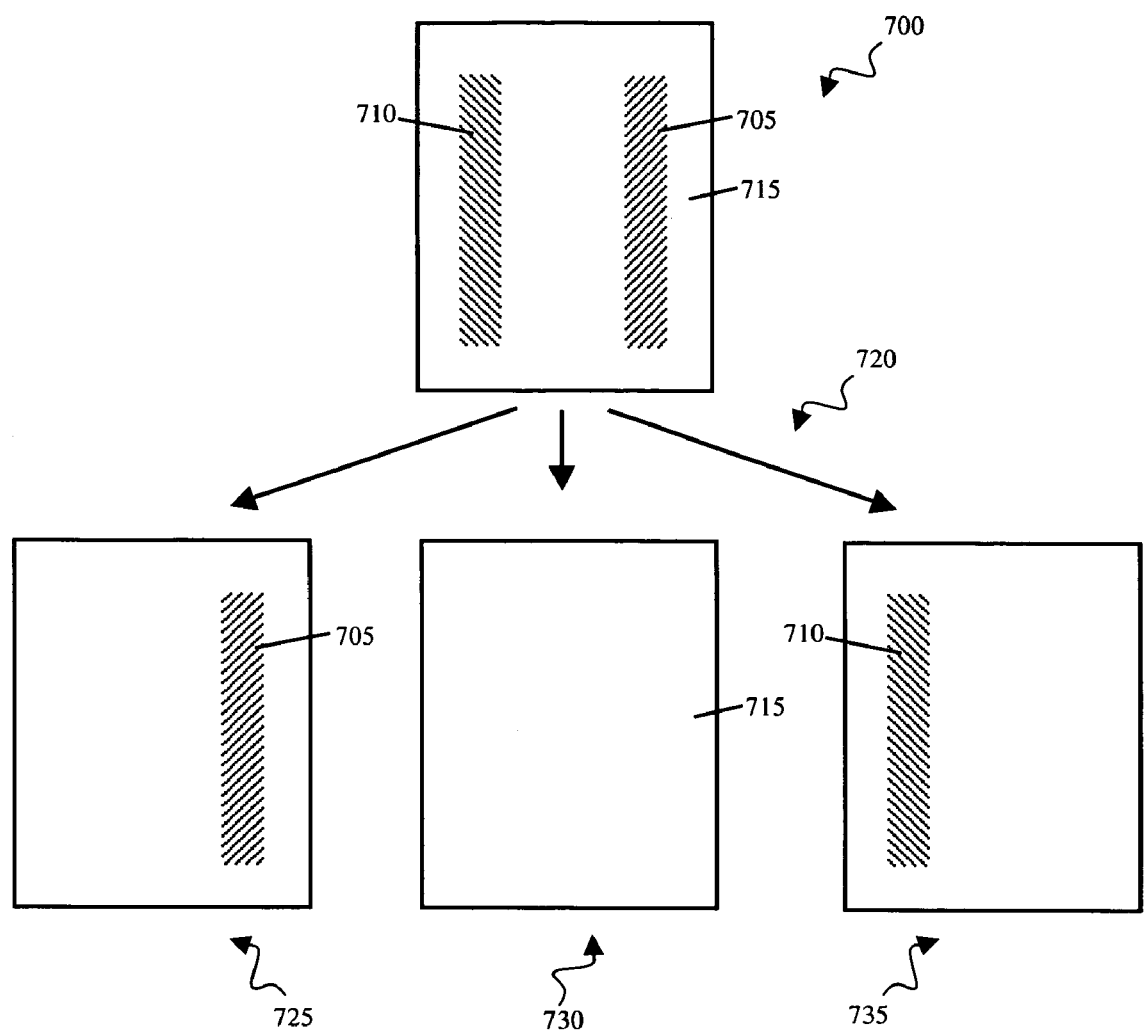
FIGS. 7, 8, and 9 illustrate implementations of a division of image data according to a deployment of print element associations.

FIG. 7 illustrates one implementation of the division of image data representing an image 700 according to a deployment of print element associations. Image 700 includes a cyan line 705, a magenta line 710, and a yellow line 715. Cyan line 705 is printable by an association of print elements deployed to print cyan. Magenta line 710 is printable by an association of print elements deployed to print magenta. Yellow line 715 is printable by an association of print elements deployed to print yellow.

When the image data representing image 700 is divided (indicated by arrows 720), three individual collections of data representing images 725, 730, 735 are formed. Image 725 includes cyan line 705 and is thus printable by an association of print elements deployed to print cyan. Image 730 includes yellow line 715 and is thus printable by an association of print elements deployed to print yellow. Image 735 includes magenta line 710 and is thus printable by an association of print elements deployed to print magenta. Thus, the image data representing images 725, 730, 735 are the result of a division of data representing image 700 according to the deployment of associations of print elements to print different colors.

Figure 8:
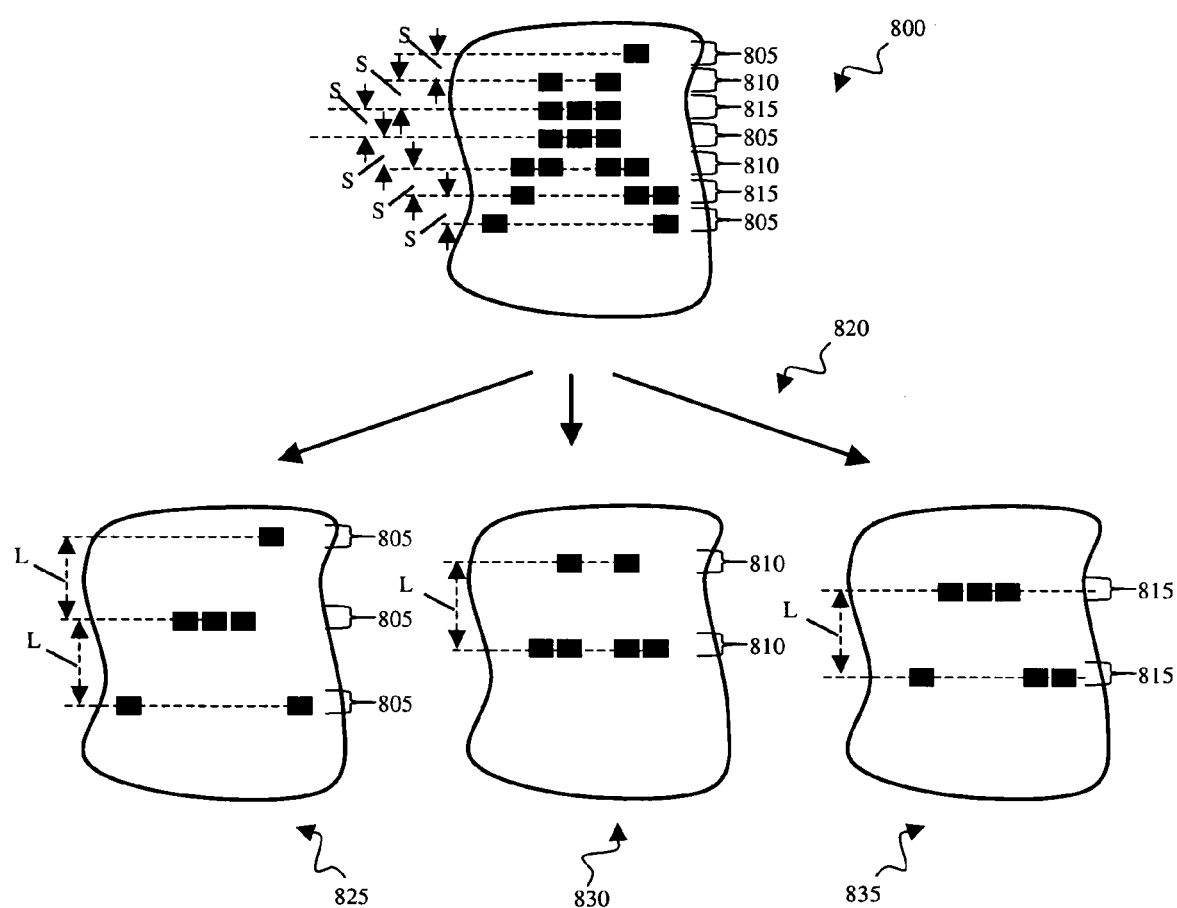

FIG. 8 illustrates another implementation of the division of image data (namely, image data representing a portion of an image 800) according to a deployment of print element associations. In particular, a division according to a deployment of print elements with relative shifts in lateral position is illustrated. The shifts in the lateral position of print elements can correspond to the lateral shifts S between print elements 405, print elements 410, and print elements 415 in the implementation of housing 110 shown in FIG. 4.

Image portion 800 includes collections of pixel rows 805, 810, 815. Pixel rows 805, 810, 815 each include a longitudinal row of pixels. Pixel rows 805 are laterally shifted relative to the position of pixel rows 810 by a shift distance S. Pixel rows 805 are laterally shifted relative to the position of pixel rows 815 by shift distance S. Pixel rows 810 are laterally shifted relative to the position of pixel rows 815 by shift distance S. Shift distance S (and hence the lateral resolution of the printed imaged) is determined by the overall lateral spacing between print elements.

When a workpiece is moved longitudinally across an array of print elements, each pixel row 805, 810, 815 can be printed by an individual print element. For example, when image portion 800 is printed using the implementation of housing 110 shown in FIG. 4, a single print element 405 can print a single pixel row 805, a single print element 410 can print a single pixel row 810, and a single print element 415 can print a single pixel row 815.

When the image data representing image portion 800 is divided (indicated by arrows 820), three individual collections of data representing image portions 825, 830, 835 are formed. Image portion 825 includes pixel rows 805 and is thus printable by a first array of print elements separated by a lateral distance L. Image portion 830 includes pixel rows 810 and is thus printable by a second array of print elements separated by a lateral distance L. Image portion 835 includes pixel rows 815 and is thus printable by a third array of print elements separated by a lateral distance L. The print elements in these arrays are shifted in lateral position relative to one another. Thus, the image data representing image portions 825, 830, 835 are the result of a division of data representing image portion 800 according to the deployment of associations of print elements to print at different lateral positions.

Figure 9:
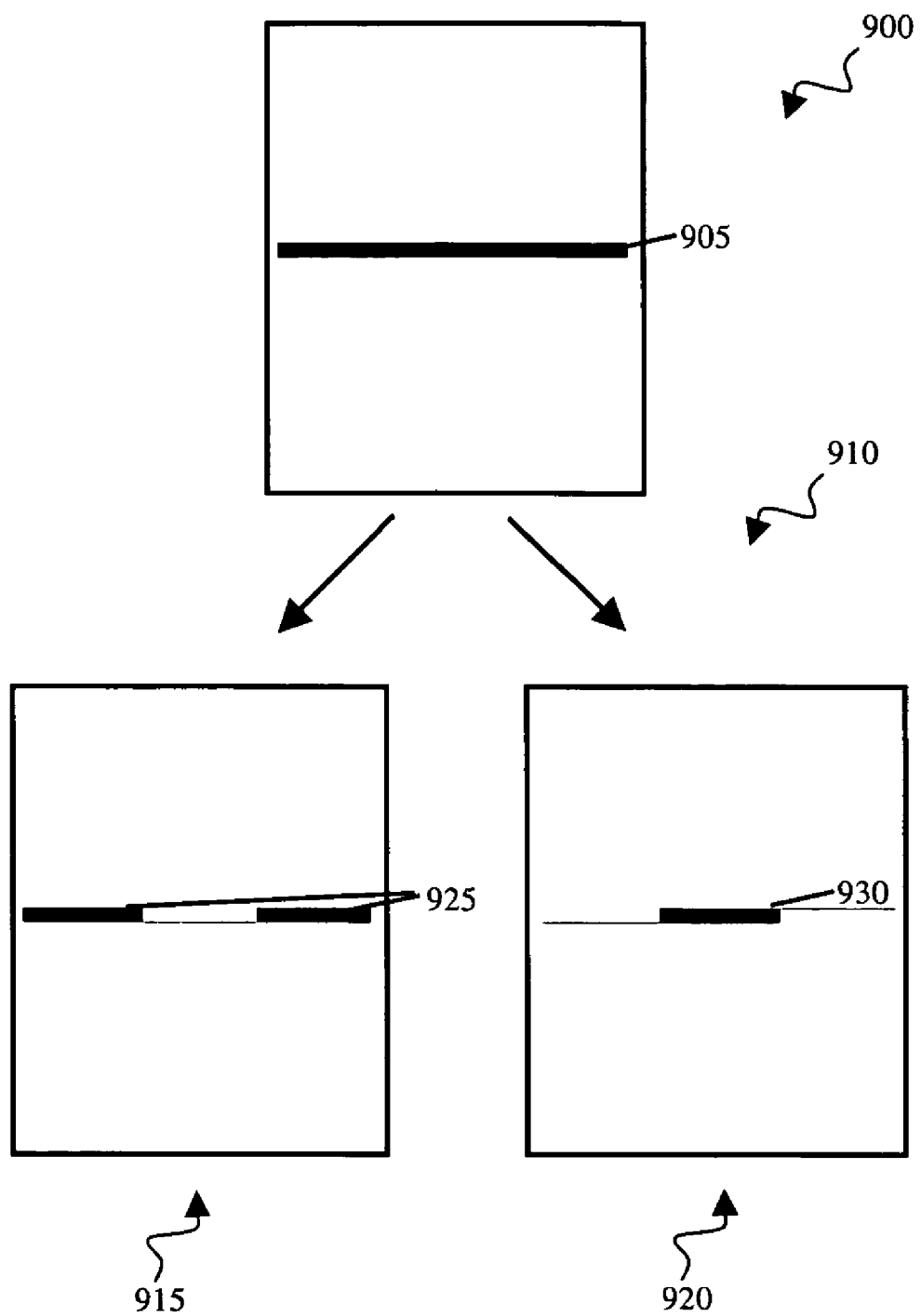

FIG. 9 illustrates another implementation of a division of image data representing an image 900 according to a deployment of print element associations. Image 900 includes a single line 905 that spans the entire lateral expanse of image 900.

When the image data representing image 900 is divided (indicated by arrows 910), two individual collections of data representing images 915, 920 are formed. Image 915 includes two outer line portions 925 and is thus printable by an association of print elements deployed toward the outside of a workpiece. For example, outer line portions 925 may be printable by an association that includes print modules 205, 305, by an association that includes print modules 215, 310, or by an association that includes print modules 225, 315 (FIG. 3).

Image 920 includes a central line portion 930 and is thus printable by an association of print elements deployed toward the center of a workpiece. For example, central line portion 930 may be printable by an association that includes print module 210, by an association that includes print module 220, or by an association that includes print module 230 (FIG. 3). Thus, the image data representing images 915, 920 are the result of a division of data representing image 900 according to the deployment of associations of print elements to print different lateral expanses.

Returning to FIG. 6, the system performing process 650 allocates the image data portions that result from a division to respective image queues at 615. In other words, the allocation results in each buffer of image data being allocated to a respective queue. In general, each buffer of image data corresponds to an association of print elements at a printing device. Similarly, a set of buffers corresponds to a set of image data to be printed by the print element associations. The buffers of image data, which were generated at 610, are queued in queues, with each queue corresponding to a print element association. For example, if there are eight image queues, each image queue corresponding to a print element association, then a set of buffers of image data that correspond to the first print element association may be allocated to the first image queue, a set of buffers of image data that correspond to the second print element association may be allocated to the second image queue, and so on. The memory locations where the image queues and the buffers are located can be dedicated to the storage of image data for printing by a specific print element association. For example, the memory locations may be blocked off from memory management by an operating system and the memory locations may be accessible by a data pump using direct memory access. The queues for the buffers of image data may be first in first out queues (i.e., FIFO queues).

At 620, the system performing process 650 determines whether the system should update the locations indicating where the print image buffers (i.e., buffers of image data) are located. For example, the system might update locations at one or more data pumps. In that example, the data pumps can store a location indicating where print buffers are located at each of the image queues so the data pumps are able to access each of the memory devices where the buffers are located and retrieve image data. If, at 620, the system determines that the locations should be updated, the locations are updated with references to the buffers at 625. Otherwise, image data is received at 605 and the process continues. Also, the process continues at 605 if updated locations are not needed at 620. In some implementations, the process of 650 may stop, for example, if there are no more images to receive (e.g., no more images to print), or if the image queues are full.

A determination is made as to whether printing should start or continue at 627. If not, the process continues at 627. If so, at 630, image data may be retrieved from buffers in the image queues. For example, a data pump may retrieve buffers of image data. In that example, the data pump is able to identify the proper buffers because the locations of the buffers may be updated at the data pump at 625. A sufficient amount of image data for one impression of an association of print elements may be retrieved. Thus, image data may be retrieved from each of the image queues. In alternative implementations, portions of image data representing a portion of a single impression may be retrieved. Similarly, portions of image data representing several impressions may be retrieved. In those implementations, a queue, such as a FIFO queue, may store image data (e.g., sets of buffers of image data).

At 635, positional delays are added to selected portions of image data. The delays are upfront delays that align image data with the associations of print elements to which respective portions of image data correspond. Thus, the extent of the upfront delay can be determined based on the deployment of the print element association to which image data corresponds. For example, a minimal positional delay or no delay at all may be inserted into image data that corresponds to a print element association near the entry of workpieces across an effective print area, whereas a larger positional delay may be inserted into image data that corresponds to a print element association near the exit of workpieces across an effective print area. Because the positional delays correspond to the position of print element associations (or rather, the separation distance between print element associations), the positional delays may differ depending on a type of print head assembly that contains the print element associations. In any case, the positional delays may be a fixed delay(s) for a particular print head assembly and the delays may be measured in an amount corresponding to an amount of print lines.

Inserting an upfront delay into image data can be performed in a number of different ways. For example, an appropriate amount of null "placeholder" data can be inserted before and after the image data portions that result from a division of image data. As another example, the upfront delay can be introduced into a data communication path between a memory location and print elements. For example, a data pump may be aligned such that the data pump can insert different upfront delays for different portions of image data at different memory locations. Inage data with delays may be sent to a printing device at 637. In alternative implementations, image data with delays may be added to a queue (e.g., a first in first out queue) prior to sending the data to a printing device. The process at 655 may continue at the process of 627 after image data is sent at 637. In some implementations, the process at 655 may stop after image data is sent at 637 for various reasons. For example, if all image data packets have been sent by a data pump, the data pump may determine at 627 that the system should no longer be printing (i.e., determine not to start or continue printing). In some implementations, empty data image packets may be sent, effectively causing no ink to be deposited on a workpiece.

The system can identify the entry of a leading edge of a workpiece to an effective print area of a print system at 640. The entry of the leading edge can be identified using a workpiece detector (such as workpiece detector 155 (FIG. 1)). The further progress of the workpiece across the effective print area can be followed by sensing the speed of the workpiece, e.g., by measuring the speed of a workpiece conveyor (such as workpiece conveyor 105 (FIG. 1)) using a rolling encoder.

When the workpiece is appropriately positioned, the print system performing process 660 can commence printing of the workpiece at 645. The printing of the workpiece can include relaying image data that has been divided according to the deployment of the print element association. The image data can be relayed from a memory location to the appropriate print element association. The relaying can be driven by a central data processing device, such as a central data processing device in control electronics 160. The relaying can be done on a firing-by-firing basis. In the processes shown in the flowcharts of FIG. 6, a signal may be sent to the system performing the process of 655 (e.g., a data pump) to start printing, causing a relaying of image data to a printing device.

As the workpiece moves across the effective print area, different print elements can be triggered by the same trigger signal to fire at the same instant. Alternatively, different print elements can be staggered to fire at different instants. Regardless of when the actual firing of individual elements occurs, the elements in the effective print area are printing on the initial workpiece at the same time.

In a print system where the effective print area has a longitudinal width that is greater than the separation distance to the next workpiece, one or more workpieces may be positioned beneath the effective print area at the same time. As such, more than one workpiece may be available for serial printing. One example of this situation is illustrated in FIG. 5, where the separation distance SEP between workpieces is smaller than width W of effective print area 235, and, both workpiece 130 and workpiece 135 are positioned beneath effective print area 235 and available to be printed in series.

In such a print system, the system performing process 660 can also identify the entry of the leading edge of a next workpiece at 640. The entry of the leading edge can be identified using a workpiece detector (such as workpiece detector 155 (FIG. 1)). The progress of both an initial workpiece and the next workpiece across the effective print area can be followed by sensing the speed of the workpieces, e.g., by measuring the speed of a workpiece conveyor (such as workpiece conveyor 105 (FIG. 1)).

Printing on both workpieces can continue as the initial workpiece and the next workpiece continue to progress across the effective print area. When the effective print area has a longitudinal width that is greater than the sum of the width of a next workpiece and twice the separation distance between workpieces, an initial workpiece, the next workpiece, and yet another workpiece may be positioned beneath the effective print area at the same time. As such, three workpieces may be available for printing in series. In this case, the system performing process 660 can identify the leading edge of another "next workpiece" at 640 before stopping printing on an initial workpiece. Otherwise, the system can stop printing on the initial workpiece before identifying the leading edge of another "next workpiece" at 640.

In some implementations, image data may be divided based on associations of print modules. In some implementations, print element associations may be split across a single print module. For example, if each print module in a print system includes two rows of print elements, image data may be divided by the rows of print elements. Thus, a space between workpieces may be reduced to zero.

In some implementations, the system(s) performing processes shown in FIG. 6 can calculate the positional delay required between print element associations (rather than having a fixed delay). The memory locations can be dedicated to specific print element associations. For example, individual buffers can store image data for printing by individual print element associations. The system performing processes shown in FIG. 6 can control a data pump or other hardware device to extract data from memory locations at the appropriate point in time to properly place image data on a workpiece on which the image data is to be printed.

Although the processes of FIG. 6 are shown as being composed of a certain number and type of processes, additional and/or different processes can be used instead. For example, in the process of 655, rather than continually determining whether to continue or start printing at 627, the system performing the process of 655 may start printing when started and stop printing when the system decides to stop printing, only to start printing when called on again. Similarly, the processes need not be performed in the order depicted, or by the components that were discussed to have performed certain processes.

Figure 10:
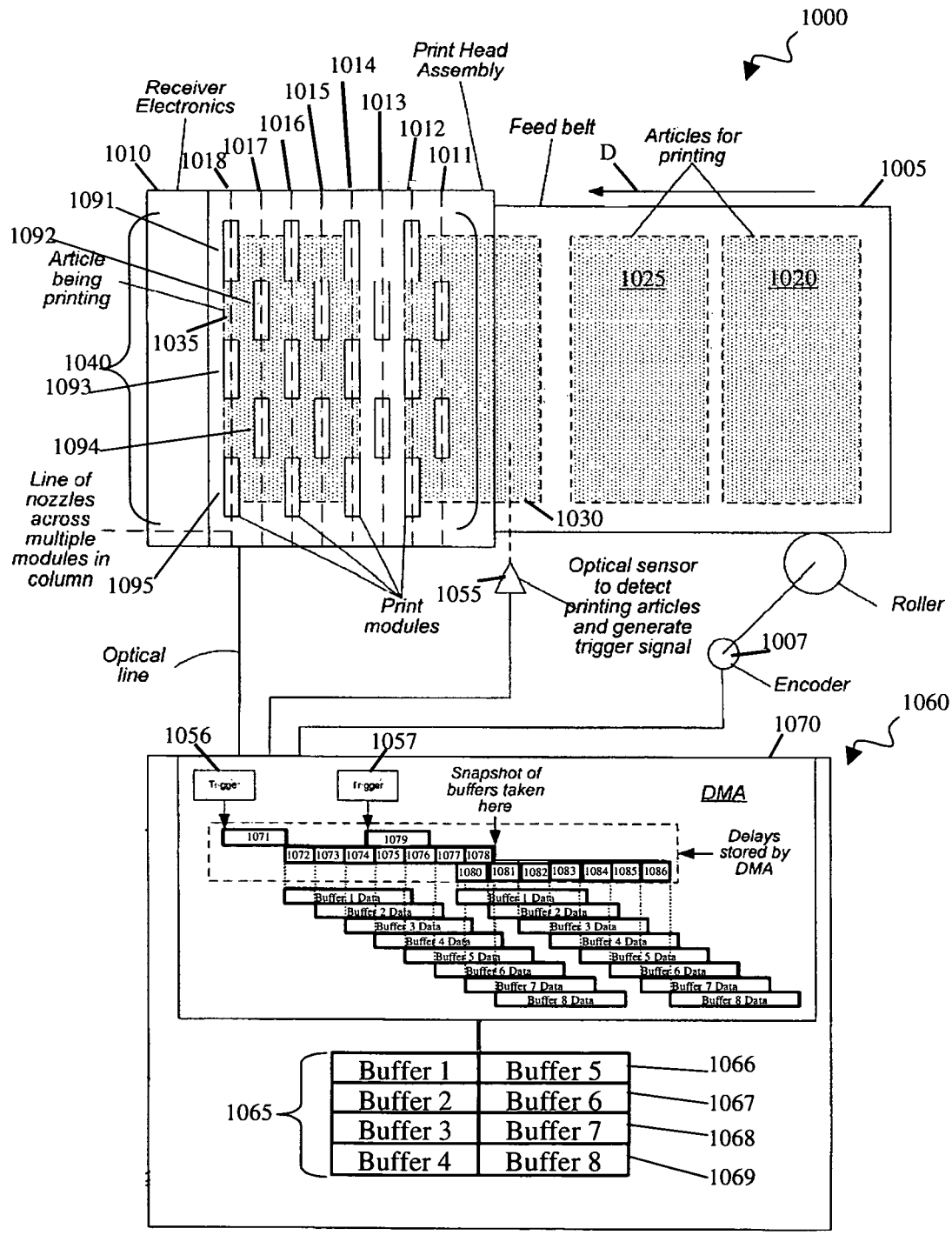
FIG. 10 shows a schematic representation of an implementation of a print system.

FIG. 10 shows a schematic representation of an implementation of a print system 1000. System 1000 includes workpiece conveyor 1005, a printer housing 1010, a workpiece detector 1055, and control electronics 1060.

Workpiece conveyor 1005 conveys workpieces 1020, 1025, 1030, 1035 in a direction D across an effective print area 1040 of printer housing 1010. Workpiece conveyor 1005 includes an encoder 1007 that senses the speed of workpieces 1020, 1025, 1030, 1035. Encoder 1007 also generates a signal that encodes the sensed speed and relays the signal to control electronics 1060. Workpiece detector 1055 is an optical sensor that detects the position of one or more workpieces 1020, 1025, 1030, 1035, and generates trigger signals (such as trigger signals 1056 and 1057) based upon that detection.

Printer housing 1010 includes a collection of print modules arranged laterally along a series of columns 1011, 1012, 1013, 1014, 1015, 1016, 1017, 1018. This arrangement of print modules spans an effective print area 1040. Each group of print modules deployed along each of columns 1011, 1012, 1013, 1014, 1015, 1016, 1017, 1018 constitutes a print element association. As examples, print modules 1091, 1093, 1095 constitute a print element association along column 1018, and print modules 1092, 1094 constitute a print element association along column 1017.

Control electronics 1060 controls the performance of print operations by system 1000. Control electronics 1060 includes a collection of print image buffers 1065. Control electronics 1060 can access the print image buffers in collection 1065 to store and retrieve image data. In the configuration shown in FIG. 10, there are eight print image buffers in collection 1065, and each print image buffer is dedicated to a print element association arranged along one of columns 1011, 1012, 1013, 1014, 1015, 1016, 1017, 1018. For example, print image buffers 1066, 1067, 1068, 1069 may correspond to the print element associations arranged along columns 1015, 1016, 1017, 1018, respectively. In particular, each print element association prints image data only from the associated print image buffer.

Control electronics 1060 also includes a data pump 1070. A "data pump" refers to a functional component, e.g., implemented in hardware, software, programmable logic or a combination thereof, that processes data and transmits it to one or more printing devices for printing. In one implementation, the data pump can refer to a direct memory access (DMA) device. The data pump 1070 is positioned along the data communication path between the print element associations and their dedicated print image buffers in collection 1065. The data pump 1070 can receive and store image data from each print image buffer in collection 1065. The data pump 1070 is programmable by control electronics 1060 to delay the communication of information from the print image buffers in collection 1065 to the print element associations.

In operation, control electronics 1060 can divide image data according to the deployment of print element associations in effective print area 1040. Control electronics 1060 can also allocate the divided image data to an appropriate print image buffer in collection 1065.

As workpiece 1035 is conveyed by workpiece conveyor 1005 to enter effective print area 1040, workpiece detector 1055 detects the leading edge of workpiece 1035 and generates trigger signal 1056. Based on receipt of trigger signal 1056, control electronics 1060 can program data pumps 1070 with positional delays 1071, 1072, 1073, 1074, 1075, 1076, 1077, 1078. Delay 1071 delays the communication of image data from a first print image buffer in collection 1065 to the print element association arranged along column 1011. Delay 1072 delays the communication of image data from a second print image buffer in collection 1065 to the print element association arranged along column 1012. Delays 1073, 1074, 1075, 1076, 1077, 1078 delay the communication of image data from respective print image buffers in collection 1065 to the print element associations arranged along columns 1013, 1014, 1015, 1016, 1017, 1018.

As workpiece 1035 is conveyed by workpiece conveyor 1005 across effective print area 1040, the print element associations arranged along columns 1011, 1012, 1013, 1014, 1015, 1016, 1017, 1018 successively print. In particular, as workpiece 1035 is advanced one scan line across effective print area 1040, the data pump 1070 dumps image data to the appropriate receiver electronics at the print element associations arranged along columns 1011, 1012, 1013, 1014, 1015, 1016, 1017, 1018 (i.e., the data pump 1070 causes the image data to be transmitted to the printing device). The dumped image data identifies print elements that are to fire for the instantaneous position of workpiece 1035 in effective print area 1040 (the identification of print elements may be implicit; e.g., an ordering of image data in a data packet in a format corresponding to an order of print elements and/or print element associations at a printing device). Data for successive firings can be loaded from print image buffers in collection 1065 to the data pump 1070 during firings.

While workpiece 1035 is still being printed, workpiece 1030 can be conveyed by workpiece conveyor 1005 to enter effective print area 1040. Workpiece detector 1055 detects the leading edge of workpiece 1030 and generates trigger signal 1057. Based on receipt of trigger signal 1057, control electronics 1060 may cause the data pump 1070 to insert delays 1079, 1080, 1081, 1082, 1083, 1084, 1085, 1086. Delay 1079 delays the communication of image data from a first print image buffer in collection 1065 to the print element association arranged along column 1011. Delay 1080 delays the communication of image data from a second print image buffer in collection 1065 to the print element association arranged along column 1012. Delays 1081, 1082, 1083, 1084, 1085, 1086 delay the communication of image data from respective print image buffers in collection 1065 to the print element associations arranged along columns 1013, 1014, 1015, 1016, 1017, 1018. Alternatively, delays may already be inserted into image data and the trigger signal may cause the sending of image data by the data pump 1070.

As workpiece 1030 is conveyed by workpiece conveyor 1005 into effective print area 1040, the print element associations arranged along columns 1011, 1012, 1013, 1014, 1015, 1016, 1017, 1018 print upon workpieces 1030, 1025. In particular, as workpieces 1035, 1030 are advanced one scan line, the data pump 1070 dumps image data to the appropriate receiver electronics for the print element and workpieces 1035, 1030 are printed at the same time.

Image data for each workpiece may differ. For example, if two workpieces were to have two different images printed upon them, different image data representing different images would be used to print on each workpiece. In that example, two sets of image data may be gathered at a data pump. A first set of image data may correspond to a first image (e.g., a print line of an image of a frog) and a second set of image data may correspond to a second image (e.g., three print lines of an image of an apple). Gathering the image data may include taking image data from image queues and/or generating a data packet that includes the first and second sets of image data. The gathered image data may be provided to the print element associations by sending a data packet to the printing device that includes the print element associations (e.g., a data packet including the print line of the image of the frog and the three print lines of the image of the apple). When the two workpieces are printed at substantially the same time, a first portion of the print buffers (e.g., print buffer 1066) may store the first set of image data corresponding to the first image (e.g., the print line of the image of the frog) and a second portion of the print buffers (e.g., print buffers 1067, 1068, 1069) may store the second set of image data corresponding to the second image (e.g., the three print lines of the image of the apple). A first set of print elements corresponding to the first set of print buffers (e.g., the print elements in the association of print elements along column 1015) can print the first image (e.g., the print line of the image of the frog) and a second set of print elements corresponding to the second set of buffers (e.g., the print elements in the associations of print elements along columns 1016, 1017, 1018) can print the second image (e.g., the three print lines of the image of the apple). As such, different print elements print two images at substantially a same time (e.g., print elements along the columns 1015, 1016, 1017, 1018 may fire at substantially a same time).

Or, the image data for each workspace may represent the same image. For example, the same image may be continually printed on multiple workpieces. In that example, if two workpieces are printed at substantially a same time, different portions of the same image may reside in different sets of print buffers such that different print elements print different portions of the same image.

Although not shown, in addition to using different sets of print elements to print different portions of image data on different workpieces, a same workpiece may be printed on with different sets of image data.

Control Architecture for Printing an Image

Figure 11:
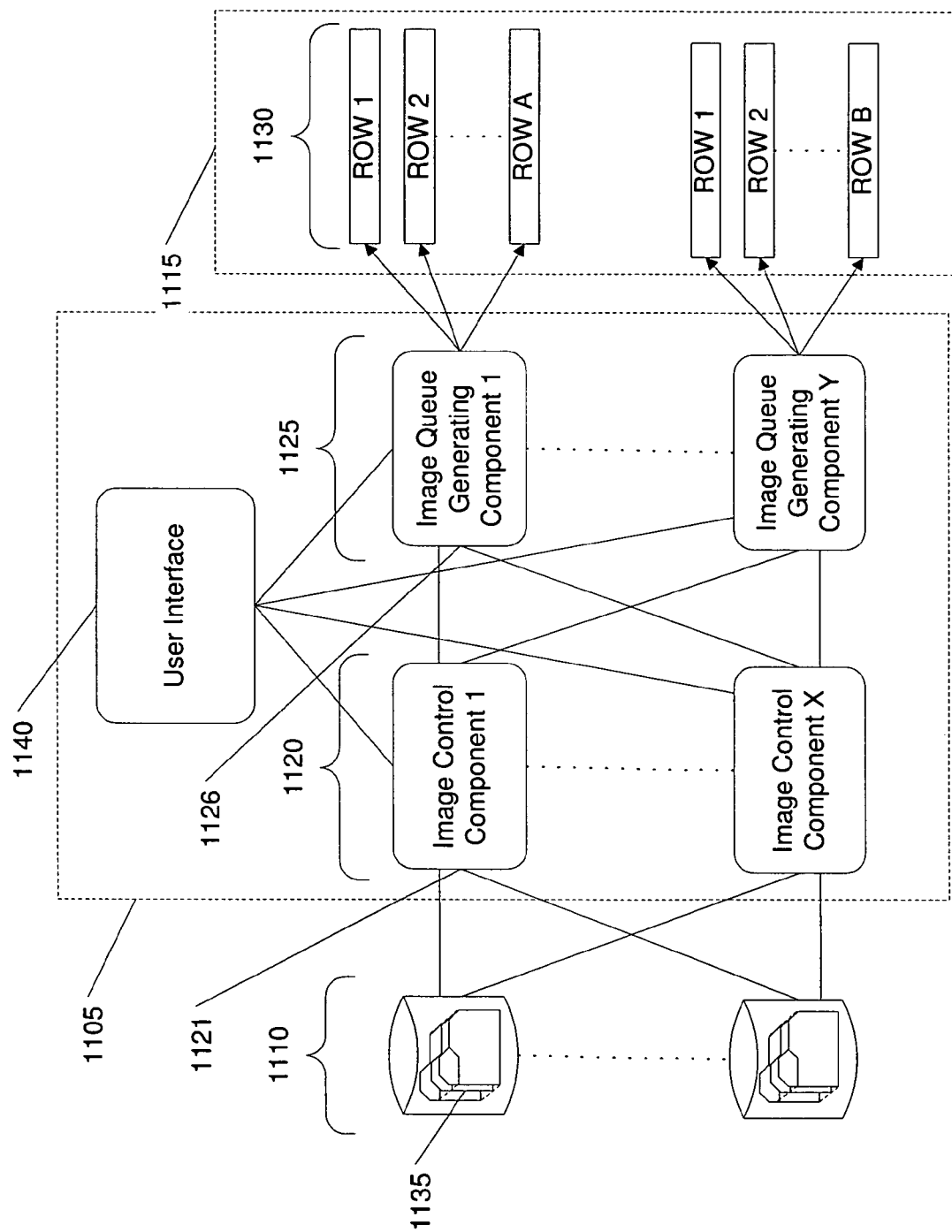
FIG. 11 is a diagram of a printing system that includes a control architecture implemented in software.

A control architecture for printing an image may be implemented in software, hardware, or a combination of the two. The control architecture can receive image data and cause an image to be printed. FIG. 11 is a diagram of a printing system that includes a control architecture implemented in software. The printing system includes a software architecture 1105; one or more databases 1110 to store files for printing; and a memory area 1115 to store image queues.

The software architecture 1105 includes one or more image control components 1120, one or more image queue generating components 1125, and a user interface 1140. The image control components 1120 can receive images from the databases 1110 (e.g., by having the image retrieved and returned to the image control components 1120) and convert the images into a format that is interpretable by the image queue generating components 1125. For example, images in the databases might be in the Portable Document Format (hereinafter "PDF"; PDF specification available from Adobe Systems Inc., San Jose, Calif.), Joint Photographic Experts Group (hereinafter "JPEG"; JPEG specification available from the International Organization for Standardization, Geneva, Switzerland), Graphics Interchange Format (hereinafter "GIF"; GIF specification available from CompuServe, Inc., Columbus, Ohio) Device Independent Bitmap (hereinafter "bitmap"; BMP specification available from Microsoft, Corp., Redmond, Wash.) formats, and the image queue generating components 1125 may only be able to read image data in a bitmap image format. In that example, the image control components 1120 may translate images received from the databases 1110 to the bitmap image data format, if an image is not already in that format.

An image received by one of the image control components 1120 can be transferred to the user interface 1140 and/or one of the image queue generating components 1125. The transfer of images from the image control components 1120 to the image queue generating components 1125 can be managed by the user interface 1140 via an application programming interface (hereinafter "API"). For example, a user may request to view an image via the user interface 1140 and the user interface 1140 may use an API call to cause the image control component 1121 to retrieve the requested image, convert the image to another format, and present that image to a user via the user interface 1140. Then, the user may choose to print that image via an interaction with the user interface 1140. Then, the user interface 1140 may make one or more API calls and cause a connection to be made between the image control component 1121 and the image queue generating component 1126. That connection may be, for example, a socket connection (i.e., a connection between processes). In that connection, the converted image can be transferred from the image control component 1121 to the image queue generating component 1126. Managing a connection may include, for example, sending an identification of an image and an identification of the queue generating component 1126 to the image control component 1121.

The image queue generating components 1125 generate image queues 1130 from one or more images. Generating the image queues may include dividing an image into portions (e.g., a portion corresponding to an amount of image data necessary for a single impression by a print element association), which may be part of a process of generating jetmap image data; generating buffers of image data that include one or more portions, which may also be part of the process of generating jetmap image data; associating each buffer of image data with one of the image queues 1130, and filling the image queues 1130 with associated buffers of image data. One technique for dividing images may involve dividing an image into portions corresponding to print element associations at a printing device and filling each image queue with a portion of the image. For example, if each print element association at a printing device prints a portion of image data, also referred to as a "division" (e.g., a portion of a scan line of an image), and the print element associations are located next to each other (e.g., if they are consecutively located across a lateral effective print area, such as in FIG. 10), an image may be divided such that a repeating sequence of image data associated with print element associations corresponds to the image queues. Following that example, if there are four image queues, each of which corresponds to a print element association at a printing device, the image can be divided into four portions, where each portion is defined by a repeating sequence of portions of image data. Thus, the first portion of image data would correspond to the first image queue, the second portion of image data would correspond to the second image queue, the third portion of image data would correspond to the third image queue, the fourth portion of image data would correspond to the fourth image queue, the fifth portion of image data would correspond to the first image queue, the sixth portion of image data would correspond to the second image queue, and so on.

Dividing images and generating image queues may involve generating a buffer of image data for each print module in a print element association, combining buffers associated with a same print element association, and generating image queues that include combined buffers associated with an image queue. For example, in FIG. 10, twenty print modules are at the printing device. An image may be divided such that each buffer has image data corresponding to a print module. Then, buffers corresponding to print modules in a same print element association, such as the print modules 1091, 1093, 1095 in a print element association including the print modules in column 1018, may be combined such that a combined buffer is associated with a print element association (e.g., a buffer associated with all of the print elements along column 1018). Then, combined buffers associated with a same print element association may be put in an image queue, such that image queues are generated and each image queue has combined buffers corresponding to a same print element association.

Dividing an image and filling the image queues 1130 may take into account various printing parameters and may be table driven. The printing parameters may include physical attributes of a printing device, such as a definition of the ordering of print elements and/or modules at a printing device, spacing of print elements and/or modules, and a native resolution of the printing device; and dynamic parameters for printing, such as print resolution, gray scale (i.e., number of bits used for each pixel), print direction (e.g., for scanning a print head laterally), and head orientation (e.g., if a print head assembly is rotated 180 degrees). As a table-driven process, the printing parameters may be used to generate a table that can be used to configure generation of image buffers and/or image queues. The table can include bit patterns and shift patterns that can be used when extracting data in accordance with a layout of print elements at a printing device. Generic processing routines for general classes of print element layouts can be used, in conjunction with a generated table, to properly extract data from an image to produce image data that can be used to generate image queues. For example, a table may be generated based on parameters corresponding to a printing device. Generic processing routines corresponding to a layout of print elements at the printing device can then be used in conjunction with the table to generate a set of buffers of image data, where each buffer corresponds to a print element association at the printing device. Then, the image queues may be filled with buffers of image data that correspond to the print element associations, such that buffers of image data that correspond to a same print element association are queued in the same image queue (e.g., all buffers corresponding to a first print element association may be in a first image queue, all buffers corresponding to a second print element association may be in a second image queue, and so on). The image queues 1130 may be filled efficiently via parallel processing, which may manipulate bytes of an image in parallel. By using a table driven approach, highly optimized queue generation routines (e.g., routines including the generic routines described above) can be used across different types of printing devices, including families of products, with little or no modification to the optimized routines.

The number of image queues 1130 may be the same as the number of printing elements at a printing device, and each of the image queues 1130 may be associated with a print element association. The image queues 1130, which include buffers of image data, may include the print image buffers 1065 of FIG. 10. Thus, the print image buffers 1065 may be generated by software for retrieval by hardware, transmission to a printing device, and printing at a printing device.

The user interface 1140 provides an interface for user interaction with the software architecture 1105. From the user interface 1140, a user can select one or more images to print, from any of a number of images that may be stored in the databases 1110, and request that the image is printed. In addition, a user can control the printing device from the user interface 1140. Controlling the printing device may include commanding the printing device to perform operations, such as requesting the printing device to print darker or lighter, or querying the printing device for status, such as the amount of ink available at the printing device. To perform these operations, the user interface 1140 manages the image control components 1120 and the image queue generating components 1125.

Because the components 1120, 1125 may be used via an API (as described earlier), a custom user interface can be generated for the software architecture 1105. Because the image control components 1120 and the image queue generating components 1125 are modular and may have an API, the software architecture 1105 may be easily scaled to a larger or smaller size, including any of a number of image control components 1120 and any of a number of image queue generating components 1125, each of which may manage any amount of tasks. Providing a scalable architecture in this manner may allow a user to optimize the software architecture 1105 depending on a variety of factors, such as the type of printing device; performance of the image control components 1120 and the image generating components 1125; and type and number of databases that are used. For example, image control components 1120 may perform pre-processing on images.

The user interface 1140, the image control components 1120, and the image queue generating components 1125 may communicate via socket connections, such as network sockets, or another suitable mechanism. Thus, any or all of the software components may reside on the same, or separate computers, and the architecture can be easily scaled. For example, a first computer may run the user interface 1140, each server in a first cluster of servers may include an image control component, and each server in a second cluster of servers may include an image queue generating component. By allowing software components to reside on different computer systems, the resources required for printing images at high speed may be distributed across many computer systems, thus being able to match printing requirements of a print application. For example, one printing device may require resources that a single computer system is unable to provide if high-speed printing was desired, thus, multiple computer systems could distribute a workload and meet the resource requirements. In addition, multiple user interfaces, such as the user interface 1140, may be used to interface with image control components 1120 and 1125. As examples, multiple users can view images and cause images to be printed at a printing device via multiple instances of a same user interface, or, different types of user interfaces providing different functions, such as a monitoring user interface and a printing configuration user interface, may run concurrently and interact with the same image control components and image queue generating components.

Because the image control components 1120 are modular and may be interfaced via an API that returns an image in a format that is interpretable by any of the image queue generating component 1125, each of the image control components 1120 may be customized for a different type of database 1110, or file system where files are stored, to provide a uniform interface for accessing images. For example, a single image queue generating component may interface with a first image control component that is customized for interfacing with images stored on a UNIX system (specification available from The Open Group, San Francisco, Calif.) and a second image control component that is customized for interfacing with images stored on a Microsoft Windows system (available from Microsoft Corporation, Redmond, Wash.). In that example, the image queue generating component need not be customized to handle the various file systems and the image queue generating component can nevertheless have a uniform view of images that may be received by the image control components 1120.

The databases 1110 can store files, such as files 1135, for printing. The files represent images and/or text, and can be in any of a number of formats. In addition, the files may exist in any of a number of file systems, such as a Microsoft Windows or UNIX file system. As an alternative to storing images in databases, the images may simply be stored in a directory tree, or in accordance with any other suitable technique.

The memory area 1115 can store image queues. The memory area 1115 may be a part of random access memory in a computer system that is partitioned from use by an operating system on which the software architecture 1105 runs. By partitioning the memory area 1115 from the operating system, the operating system does not manage that portion of memory. Thus, image queues in the memory area 1115 are likely to stay in contiguous memory. As a contiguous area of memory, the memory area 1115 can be used for direct memory access from hardware devices. For example, data pumps (i.e., a hardware architecture for assembling data packets to send to a print head assembly) may access the memory area 1115 to directly retrieve image data from the image queues. In that example, having a contiguous area of memory may facilitate the lining up of image queues in the memory area 1115 for direct access from the data pumps, thus removing a level of complexity (i.e., determining a location in physical memory where items in the image queues exist) and thus improving the efficiency of the printing system.

Because the software architecture 1105 can operate independently of other devices, such as a data pump, the software architecture 1105 can continually cause image queues to be generated until the memory area 1115 is full. By allowing the software architecture 1115 to continue generating image queues 1130, no other components, such as a data pump, need wait for other components in the printing system. All image pre-processing and processing, including image queue generation, can be performed in memory. By performing all operations in memory (outside of accessing images stored on a storage device, network, and the like), the entire process may avoid bottlenecks that may occur due to latencies in accessing a storage device, and the like.

In some implementations, the image control and image queue generating components 1120, 1125 may be software services that run slightly above an operating system and start automatically, and the user interface component 1140 may be an application. As such, these services can be available to all users accessing a computing system and are not started on a per user basis like an application, similar to the behavior of networking or printing services. Because the user interface component is an application, the user interface component can be started by a user and is closed if a user logs off. Because the components may be accessible via sockets, one or more applications can interact with the services via sockets.

In alternative implementations the system illustrated in FIG. 11 may include fewer, additional, and/or different components. For example, a single software module may perform the operations of the image queue generating components 1125 and the image control components 1120. As another example, rather than accessing the image control components 1120 and the image queue generating components 1125 through the user interface 1140, the software architecture 1105 may include only the image control components 1120 and the image queue generating components 1125 and the software architecture may be accessed by another program for printing an image. For example, that software architecture may be accessed by an image-editing tool for printing an image from the image-editing tool. Thus, that software architecture can be a driver for printing from any other software. Also, each of the components of the software architecture may perform fewer, additional, and/or different operations. For example, images may be converted to a format for printing by the image queue generating components 1125 and the image control components 1120 need not necessarily perform any conversion of images to different image formats.

Figure 12:
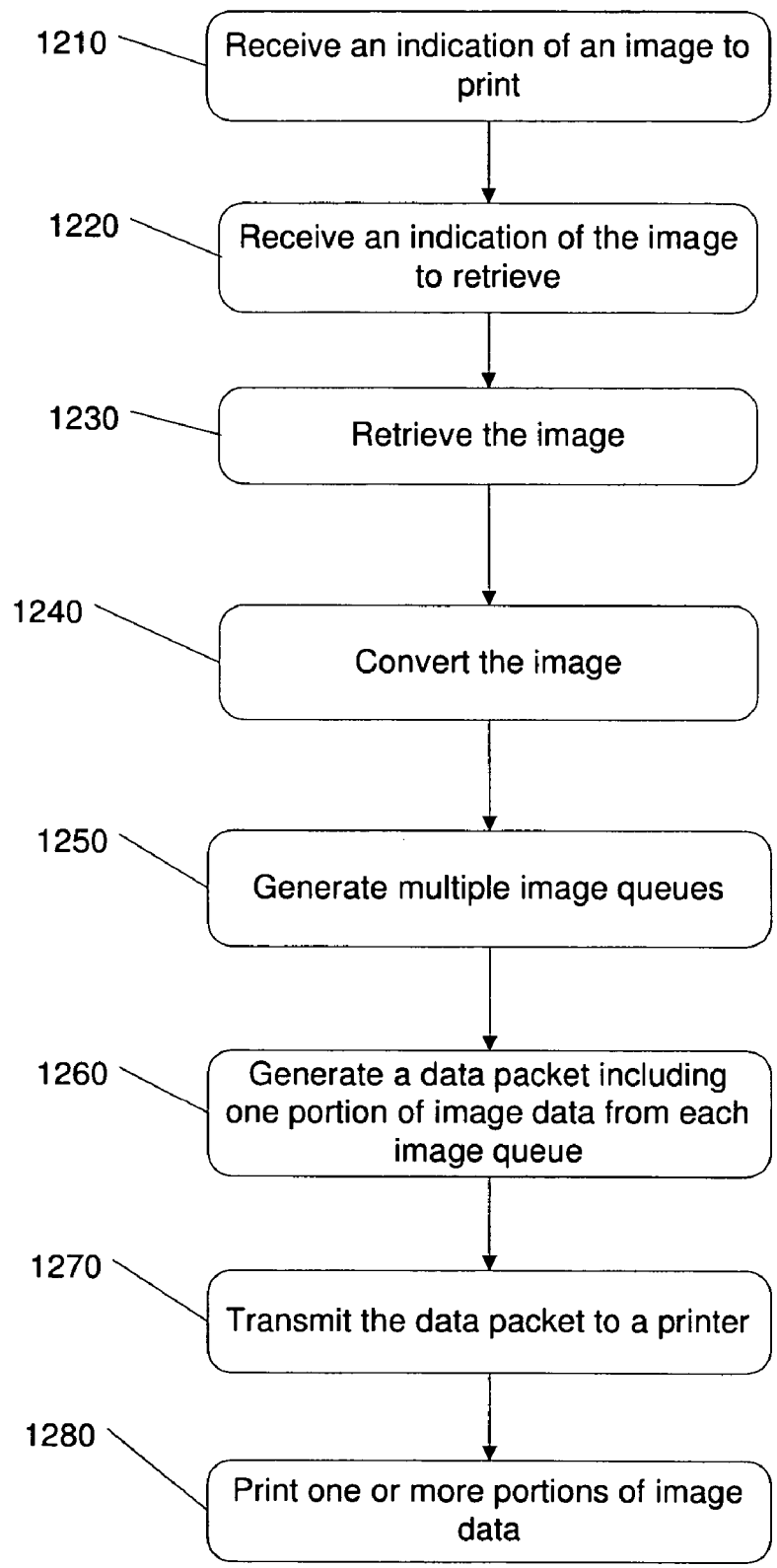
FIG. 12 is a flowchart of a process for printing an image.

FIG. 12 is a flowchart of a process for printing an image. The image is printed at a printing device, such as the printing device illustrated in FIG. 10. The printing device includes at least two print element associations, each of which receives data for printing the image. Data is transmitted to the printing device from a computer system, which may be the control electronics 1060 of FIG. 10. The computer system includes one or more user interface devices, such as a display device and a keyboard. In addition, the computer system includes printing software through which a user can print images. The printing software includes at least one image control component and an image queue generating component, such as those described in reference to FIG. 11.

At 1210, an indication of an image to be printed is received. This indication is received at the printing software in the computer system. For example, a name of a file to be printed may be selected for printing, and that name may serve as an indication of a file to be printed.

At 1220, an indication of an image to retrieve is received at the computer system. For example, a user interface component may check to see if one or more images are available for printing. If so, the user interface component may send to an image control component a list of images that are to be printed, an image queue generating component where pre-processed image data should be transferred, and/or how the pre-processed image data should be transferred to another software component. Then, the image control component may open a connection with an image queue generating component and send pre-processed image data to the image queue generating component. In that example, because the image control component receives a list of images to be printed before a connection is opened with an image queue generating component, the image control component can continually generate image data from one or more images prior to opening a connection. In that manner, the image control component can pre-process and queue a lot of image data and when a connection is made with an image queue generating component, all of the image data may be transferred at a high data rate as both components may reside in memory. Because image data can be pre-processed and image queue generating components can operate independently of the image control components, work can overlap such that one or more control components can pre-process image data and one image queue generating component (or fewer if there are multiple image control components) can generate image queues. As another example, the printing software may send an indication of an image to be printed and a user interface component of the printing software may make an API call to an image control component retrieve the image.

At 1230, the image is retrieved. The image control component that received the indication of an image retrieves the image. The image may be retrieved from a database or simply from a file system. The image may be located on a storage device that is a part of the computer system that includes the printing software, or somewhere else. For example, images may be stored across various network-accessible computer systems, and the image may be from one of those computer systems.

At 1240, the image is converted to a generic format. Converting the image causes the image to be transformed (or changed) from its native format to a format that is suitable for the image queue generating component. In other implementations, additional and/or other types of pre-processing (i.e., processing the image before it is relayed to an image queue generating component) may be performed. For example, an image may be resized, color transformations may be applied to the image, and the like.

At 1250, one or more image queues are generated. The image queues may be generated by one or more image queue generating components. Each image queue represents a portion of the image (i.e., a portion of image data) and there is one image queue corresponding to each print element association. For example, each print element association of a printing device may print a single portion (or division) of image data and there may be 8 print element associations at the printing device. In that example, the image may be divided and the image queues may be filled such that a first image queue has a first portion of the image, a second image queue has a second portion of the image, and so on, until the ninth portion of the image, when the process repeats with the first image queue having a ninth portion of the image, the second image queue having a tenth portion of the image, and so on. In some implementations, generating the portions of image data for image queues may involve generating buffers for each print module in a printing devices, combining buffers to generate combined buffers corresponding to print element associations, and filling image queues with combined buffers that are associated with a same print element association (as described earlier). Thus, in those implementations, each print element association has a queue of buffers waiting to be printed. Because image data may be split into various portions, each corresponding to a different print element association, different images can be printed at the same time (as described in reference to FIG. 10). For example, a first set of buffers may include image data representing part of one image and a second set of image buffers may include image data representing part of another image. As another example, a queue of buffers may contain buffers representing multiple images such that when image data representing a first image is drawn from the image queue, the image queue may have buffers representing another image while buffers representing the previous image are still in other image queues. Dividing the image into image buffers may be part of a process of converting the image data to jetmap image data, as the image data is converted to a format that corresponds to the geography of print element associations at a printing device as the image is divided.

At 1260, a data packet is generated. The data packet is generated at a data pump and includes at least one portion of image data from each image queue, which altogether is sufficient to cause all print element associations at a printing device to print once (e.g., a single firing of inkjet heads at an inkjet printer). In alternative implementations, other amounts of data may be included in the data packet. For example, less image data may be included in a data packet. Also, a data packet need not include image data from each image queue. As examples, one data packet may include image data from one or two image queues in a system that includes eight image queues.

At 1270, the data packet is transmitted to a printing device. The data may be transmitted in accordance with communications protocols such as the Fibre Channel Protocol (specification available from American National Standards Institution, New York, N.Y. and significantly described in ANSI X3.230-1994), or another suitable protocol. For example, a lightweight protocol may be used because such a protocol may eliminate unnecessary resources consumed while transmitting image in accordance with a heavier protocol. A lightweight protocol may, for example, include the lower two levels of the Fibre Channel Protocol and a modified, lightweight version of the third level of the Fibre Channel Protocol that includes the minimal amount of the protocol necessary for transmitting image data to a printing device.

At 1280, one or more portions of an image, corresponding to a print element association, are printed at a printing device. For example, the processes at 1290 may include a single firing of inkjet heads at an inkjet printer. The image data used to print the portions of the image are from a data packet that is transmitted to the printing device.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, subroutine, or other unit suitable for use in a computing environment.

One type of programming language, known as an object oriented programming language, may use classes to define data structures. A class defines the members of an object. Each object is an instance of a class. Members of a class may include methods, variables, and references. Methods, also known as procedures, functions, and the like, include a series of statements that are compiled and/or executed by a processor and/or virtual machine. Methods may generate a return value, also known as output. Methods can use mechanisms and techniques other than return values to produce output, including mechanisms that cause information to be written to a file, displayed on a display device, or sent over a network. Methods are invoked by a function call. A function call specifies the method name and may provide arguments that a called method can manipulate. Constructors are a special type of method that initializes an object and/or generates an instance of an object. Variables, also known as parameters, attributes, and the like, can be assigned a value. Variables may be constant, such that the assigned value need not change during the execution of a program, or dynamic, such that the assigned value may change during the execution of a program. Variables can be of any data type, including character, integer, float, packed integer, and user-defined class. Variables can also be in the form of a reference-type variable, known as a pointer. A reference need not be a variable, and can be used to reference a variable. In other programming languages, or types of programming languages, programming constructs other than a class may represent data structures.

A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, although the process described in FIG. 12 is composed of a certain number and kind of processes, alternative implementations may include additional and/or different processes. Accordingly, other implementations are within the scope of the following claims.

What is claimed is:

1. A computer-implemented method of facilitating image printing on a plurality of print media, the method comprising:
   transferring one or more images to be printed to a first software component;
   using the first software component to selectively pre-process the one or more images depending on a format of the one or more images;
   using a second software component to divide the one or more pre-processed images into portions, generate a plurality of buffers of the one or more images from the portions of the one or more pre-processed images, each buffer associated with a single row of one or more print modules from a plurality of rows of one or more print modules, the single row of one or more print modules extending in a direction perpendicular to a printing direction, and generate a plurality of image queues from the plurality of buffers;
   conveying a plurality of print media in the print direction with varying spacing between the print media;
   generating a first trigger signal when a leading edge of a first print media of the plurality of print media is detected;
   generating a second trigger signal when a leading edge of a second print media of the plurality of print media is detected;
   based on receipt of the first trigger signal, inserting delays between initiations of communication of image data from the plurality of buffers to the plurality of rows of one or more print modules such that the one or more images can be printed on the first print media; and
   based on receipt of the second trigger signal, inserting delays between initiations of communication of image data from the plurality of buffers to the plurality of rows of one or more print modules such that the one or more images can be printed on the second print media, the printing on the second print media beginning before the first print media has passed all of the rows of print modules.

2. The method of claim 1, wherein the plurality of buffers store a sufficient amount of image data to cause the rows of print modules to leave a single image on a print media.

3. The method of claim 1, wherein the plurality of buffers store a sufficient amount of image data to cause the rows of print modules to leave a plurality of images on one or more print media.

4. The method of claim 1, wherein transferring the one or more images comprises receiving the one or more images from a storage device.

5. The method of claim 1, wherein the first and second software components are accessible via an application programming interface.

6. The method of claim 1, wherein the first and second software components are software services, the method further comprising:
sending an indication of an image to print and an indication of the second software component from an application comprising a user interface to the first software component.

7. The method of claim 1, wherein using a second software component to generate a plurality of image queues comprises generating the plurality of image queues such that each image queue is located in a predefined memory location for access by a data pump.

8. The method of claim 7, wherein the memory location is partitioned memory that is inaccessible by memory management of an operating system.

9. The method of claim 1, wherein using a second software component to generate a plurality of image queues comprises generating the plurality of image queues according to generic routines and a table generated based on printing parameters, the method further comprising:
generating the table based on printing parameters.

10. The method of claim 1, wherein the first software component comprises an image control component.

11. The method of claim 1, wherein the second software component comprises an image queue generating component.

12. The method of claim 1, wherein using a second software component to generate a plurality of image queues comprises parallel processing image data to generate the plurality of image queues from the transferred one or more images.

13. A system for controlling image printing on a plurality of print media, the system comprising:
a data repository configured to store images;
a memory area configured to store one or more image queues corresponding to an image being printed; and
a computer system operable to perform tasks comprising:
transferring from the data repository one or more images to be printed to a first software component;
using the first software component to determine a format of the one or more images and to selectively pre-process the one or more images depending on the determined format; and
using a second software component to divide the one or more pre-processed images into portions, generate a plurality of buffers of the one or more images from the portions of the one or more pre-processed images, each buffer associated with a single row of one or more print modules from a plurality of rows of one or more print modules, the single row of one or more print modules extending in a direction perpendicular to a printing direction, and generate in the memory area a plurality of image queues from the plurality of buffers;
conveying a plurality of print media in the print direction with varying spacing between the print media;
receiving a first trigger signal when a leading edge of a first print media of the plurality of print media is detected;
receiving a second trigger signal when a leading edge of a second print media of the plurality of print media is detected;
based on receipt of the first trigger signal, inserting delays between initiations of communication of image data from the plurality of buffers to the plurality of rows of one or more print modules such that the one or more images can be printed on the first print media; and
based on receipt of the second trigger signal, inserting delays between initiations of communication of image data from the plurality of buffers to the plurality of rows of one or more print modules such that the one or more images can be printed on the second print media, the printing on the second print media beginning before the first print media has passed all of the rows of print modules.

14. The system of claim 13, wherein the first and second software components are accessible via an application programming interface.

15. The system of claim 13, wherein the first and second software components are software services and the computer system is further operable to perform tasks comprising:
sending an indication of an image to print and an indication of the second software component from an application comprising a user interface to the first software component.

16. The system of claim 15, wherein the application comprising the user interface is an application separate from the first and second software components configured to reside on a machine separate from a machine where the first and second software components reside.

17. The system of claim 13, wherein the memory area is partitioned memory that is inaccessible by memory management of an operating system.

18. The system of claim 13, wherein the first software component comprises an image control component.

19. The system of claim 13, wherein the second software component comprises an image queue generating component.

20. The system of claim 13, wherein using a second software component to generate a plurality of image queues comprises parallel processing image data to generate the plurality of image queues from the transferred image.

21. A computer program product, tangibly embodied in a machine-readable storage device, comprising instructions to cause a data processing apparatus to:
receive one or more images to be printed on a media, determine a format of the received one or more images, and selectively pre-process the one or more received images depending on the determined format; and
divide the one or more pre-processed images into portions, generate a plurality of buffers of the one or more images from the portions of the one or more pre-processed images, each buffer associated with a single row of one or more print modules from a plurality of one or more print modules, the single row of one or more print modules extending in a direction perpendicular to a printing direction, and generate a plurality of image queues from the plurality of buffers;
receive a first trigger signal when a leading edge of a first print media of a plurality of print media is detected, the plurality of print media having varying spacing;
receive a second trigger signal when a leading edge of a second print media of the plurality of print media is detected;
based on receipt of the first trigger signal, insert delays between initiations of communication of image data from the plurality of buffers to the plurality of rows of one or more print modules such that the one or more images can be printed on the first print media; and based on receipt of the second trigger signal, inserting delays between initiations of communication of image data from the plurality of buffers to the plurality of rows of one or more print modules such that the one or more images can be printed on the second print media, the printing on the second print media beginning before the first print media has sassed all of the rows of print modules.

22. The computer program product of claim 21, wherein the instructions further cause the data processing apparatus to transfer the one or more pre-processed images to the second software components.

23. The computer program product of claim 21, wherein the instructions further comprise:
   user interface instructions to generate a user interface configured to interact with a user and send an indication of one or more images to be printed to the first software components.

24. The computer program product of claim 23, wherein the instructions to receive one or more images and the instructions to divide the one or more pre-processed images are services and the user interface instruction is an application.

25. The computer program product of claim 21, wherein the instructions to receive one or more images reside on a first computer system, and the instructions to divide the one or more pre-processed images reside on a second separate computer system.

26. The method of claim 1, wherein the first software component is an Nth software component of a plurality of first software components and wherein the second software component is an Mth software component of a plurality of second software components.

27. The system of claim 13, wherein the first software component is an Nth software component of a plurality of first software components and wherein the second software component is an Mth software component of a plurality of second software components.

28. The method of claim 1, wherein the plurality of rows of print modules includes a first row of print modules associated with a first buffer and a second row of print modules associated with a second buffer, and wherein a first plurality of adjacent print modules from the first row are positioned in a staggered non-overlapping arrangement with a second plurality of adjacent print modules from the second row.

29. The method of claim 1, wherein printing on the second print media begins before the leading edge of the first print media has passed all of the rows of print modules.

30. The method of claim 1, wherein the plurality of print media are conveyed on a conveyor belt.

* * * * *

UNITED STATES PATENT AND TRADEMARK OFFICE
CERTIFICATE OF CORRECTION

| | | |
|---|---|---|
| PATENT NO. | : 7,911,625 B2 | Page 1 of 1 |
| APPLICATION NO. | : 10/966024 | |
| DATED | : March 22, 2011 | |
| INVENTOR(S) | : Robert Martin | |

It is certified that error appears in the above-identified patent and that said Letters Patent is hereby corrected as shown below:

<u>Column 1, Assignee</u>:

Delete "Dimatrix" and insert --Dimatix--

<u>Column 27, Line 7</u>:

Delete "sassed" and insert --passed--

Signed and Sealed this
Thirty-first Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,911,625 B2 | Page 1 of 1 |
| APPLICATION NO. | : 10/966024 | |
| DATED | : March 22, 2011 | |
| INVENTOR(S) | : Robert Martin et al. | |

It is certified that error appears in the above-identified patent and that said Letters Patent is hereby corrected as shown below:

Title Page, Item (73) Assignee:

Delete "Dimatrix" and insert --Dimatix--

Column 27, Line 7:

Delete "sassed" and insert --passed--

This certificate supersedes the Certificate of Correction issued May 31, 2011.

Signed and Sealed this
Twenty-eighth Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,911,625 B2 | Page 1 of 1 |
| APPLICATION NO. | : 10/966024 | |
| DATED | : March 22, 2011 | |
| INVENTOR(S) | : Robert Martin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1104 days.

Signed and Sealed this

Twenty-third Day of August, 2011

David J. Kappos
*Director of the United States Patent and Trademark Office*